United States Patent
Ohkubo

(10) Patent No.: US 10,654,454 B2
(45) Date of Patent: May 19, 2020

(54) VEHICLE BRAKE SYSTEM

(71) Applicant: Toyota Jidosha Kabushiki Kaisha, Toyota-shi, Aichi-ken (JP)

(72) Inventor: Masayasu Ohkubo, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 66 days.

(21) Appl. No.: 16/007,133

(22) Filed: Jun. 13, 2018

(65) Prior Publication Data
US 2019/0039579 A1 Feb. 7, 2019

(30) Foreign Application Priority Data

Aug. 7, 2017 (JP) .................................. 2017-152495

(51) Int. Cl.
| | |
|---|---|
| *B60T 13/74* | (2006.01) |
| *B60T 8/17* | (2006.01) |
| *B60T 1/06* | (2006.01) |
| *B60T 13/58* | (2006.01) |
| *B60L 7/18* | (2006.01) |
| *B60L 7/26* | (2006.01) |
| *B60T 13/66* | (2006.01) |
| *B60T 8/40* | (2006.01) |

(Continued)

(52) U.S. Cl.
CPC ....... *B60T 8/17* (2013.01); *B60L 7/18* (2013.01); *B60L 7/26* (2013.01); *B60L 15/2009* (2013.01); *B60T 1/065* (2013.01); *B60T 7/042* (2013.01); *B60T 7/22* (2013.01); *B60T 8/4072* (2013.01); *B60T 8/4081* (2013.01); *B60T 13/58* (2013.01); *B60T 13/586* (2013.01); *B60T 13/662* (2013.01); *B60T 13/741* (2013.01); *B60T 2210/12* (2013.01); *B60T 2220/04* (2013.01); *B60T 2270/608* (2013.01)

(58) Field of Classification Search
CPC ....... B60T 7/042; B60T 13/586; B60T 13/741
USPC .................................................. 303/151–152
See application file for complete search history.

(56) References Cited

U.S. PATENT DOCUMENTS

| | | | | |
|---|---|---|---|---|
| 5,366,280 A | * | 11/1994 | Littlejohn | ............... B60L 15/20 188/1.11 L |
| 5,366,281 A | * | 11/1994 | Littlejohn | ............... B60L 15/20 188/156 |

(Continued)

FOREIGN PATENT DOCUMENTS

JP 2012-240632 A 12/2012

*Primary Examiner* — Bradley T King
(74) *Attorney, Agent, or Firm* — Sughrue Mion, PLLC

(57) ABSTRACT

A vehicle brake system, wherein an electric brake device is configured such that a clearance exists between a friction member and a rotary body when no braking force request is made, and wherein a controller is configured to: execute, for a hydraulic brake device, from a time point of generation of the request, a braking-force-request-dependent control for generating a hydraulic braking force in accordance with a degree of the request; and execute, for the electric brake device, (a) a clearance removing control for removing the clearance, which is executed from the time point of generation of the request till a time point when the degree increases up to a threshold degree, and (b) a braking-force-request-dependent control for generating an electric braking force in accordance with the degree of the request, the control being executed after the time point when the degree becomes equal to the threshold degree.

7 Claims, 10 Drawing Sheets

(51) Int. Cl.
  *B60T 7/04*   (2006.01)
  *B60T 7/22*   (2006.01)
  *B60L 15/20*  (2006.01)

(56) References Cited

U.S. PATENT DOCUMENTS

| | | | | |
|---|---|---|---|---|
| 5,539,641 | A | * | 7/1996 | Littlejohn ............. B60T 8/1764 303/152 |
| 6,969,126 | B2 | * | 11/2005 | Ichinose ................ B60T 7/042 188/1.11 E |
| 2009/0256417 | A1 | * | 10/2009 | Ishii ....................... B60T 8/267 303/152 |
| 2014/0069750 | A1 | | 3/2014 | Nohira et al. |
| 2014/0100751 | A1 | * | 4/2014 | Yoo ........................... B60T 1/10 701/70 |
| 2017/0232849 | A1 | * | 8/2017 | Yamamoto ................ B60L 7/26 303/15 |
| 2017/0297452 | A1 | * | 10/2017 | Cho .................... B60L 15/2009 |
| 2018/0126862 | A1 | * | 5/2018 | Huh .......................... B60T 1/10 |
| 2019/0145475 | A1 | * | 5/2019 | Yamauchi ............... F16D 65/18 188/72.8 |

* cited by examiner

VEHICLE BRAKE SYSTEM

CROSS REFERENCE TO RELATED APPLICATION

The present application claims priority from Japanese Patent Application No. 2017-152495, which was filed on Aug. 7, 2017, the disclosure of which is herein incorporated by reference in its entirety.

BACKGROUND

Technical Field

The following disclosure relates to a vehicle brake system including a hydraulic brake device configured to generate a braking force that depends on a pressure of a working fluid and an electric brake device configured to generate a braking force that depends on a force exerted by an electric motor.

Description of Related Art

The electric brake device is configured in general to generate a braking force such that a piston is advanced by an electric motor so as to push friction members (such as brake pads) onto a rotary body (such as a disc rotor) that rotates with a wheel. When there is no request for the braking force, namely, in a non-request condition of the braking force, it is possible to retract the piston by the electric motor to such an extent that a state in which a sufficient clearance exists between the rotary body and the friction members is established, as described in Japanese Patent Application Publication No. 2012-240632, for instance. (The state will be hereinafter referred to as "clearance existing state" where appropriate.) Owing to the establishment of the clearance existing state, it is possible to avoid or reduce, in the non-request condition of the braking force, a phenomenon in which the rotary body rotates while being in contact with the friction members, namely, the so-called drag phenomenon.

SUMMARY

When considering a vehicle brake system in which a hydraulic brake device is provided for one of a front wheel and a rear wheel and an electric brake device is provided for the other of the front wheel and the rear wheel (i.e., a hydraulic-electric hybrid brake system), a characteristic as to a time from a time point of generation of the braking force request to a time point when the braking force is substantially generated, i.e., a response, differs between the hydraulic brake device and the electric brake device. It is thus estimated that timing when an electric braking force is generated by the electric brake device is not appropriate with respect to timing when a hydraulic braking force is generated by the hydraulic brake device. Typically, the electric brake device ensures good response, as compared with the hydraulic brake device. In the case where the electric brake device is configured to establish the clearance existing state indicated above in the non-request condition of the braking force, a special consideration is necessary for the timing of generation of the electric braking force, so as to improve utility of the hydraulic-electric hybrid brake system. Thus, the present disclosure relates to a hydraulic-electric hybrid brake system having high utility.

In one aspect of the present disclosure, a vehicle brake system is a hydraulic-electric hybrid brake system including an electric brake device configured to establish the clearance existing state in the non-request condition of the braking force, the system being configured to execute, for a hydraulic brake device, a braking-force-request-dependent control in which a hydraulic braking force in accordance with a degree of the braking force request is generated, the braking-force-request-dependent control being executed from a time point of generation of the braking force request, and to execute, for the electric brake device, (a) a clearance removing control for cancelling the clearance existing state, the clearance removing control being executed form the time point of generation of the braking force request till a time point when the degree of the braking force request increases up to a threshold degree, and (b) a braking-force-request-dependent control in which an electric braking force in accordance with the degree of the braking force request is generated, the braking-force-request-dependent control being executed after the time point when the degree of the braking force request becomes equal to the threshold degree.

ADVANTAGEOUS EFFECTS

According to the vehicle brake system of the present disclosure, while the clearance existing state is established in the non-request condition of the braking force, the execution of the clearance removing control enables the timing of generation of the electric braking force to be appropriate with respect to the timing of generation of the hydraulic braking force. As a result, the vehicle brake system of the present disclosure has high utility.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

(1) A vehicle brake system, comprising: a hydraulic brake device provided for one of a front wheel and a rear wheel and configured to generate a hydraulic braking force that depends on a pressure of a working fluid; an electric brake device provided for the other of the front wheel and the rear wheel and configured to generate an electric braking force that depends on a force exerted by an electric motor; and a controller configured to control operations of the hydraulic brake device and the electric brake device, wherein the electric brake device includes a rotary body configured to rotate with the other of the front wheel and the rear wheel, a friction member configured to be pushed onto the rotary body, and an actuator configured to advance a piston by the electric motor so as to push the friction member onto the rotary body, the electric brake device being configured such that, when no braking force request is made, the piston is retracted to a set backward position so as to allow a clearance to exist between the friction member and the rotary body, wherein the controller is configured to:

execute, for the hydraulic brake device, a braking-force-request-dependent control in which the hydraulic braking force in accordance with a degree of the braking force request is generated, the braking-force-request-dependent control being executed from a time point of generation of the braking force request; and execute, for the electric brake device, (a) a clearance removing control for removing the clearance, the clearance removing control being executed from the time point of generation of the braking force request till a time point when the degree of the braking force request increases up to a threshold degree, and (b) a braking-force-request-dependent control in which the electric braking force in accordance with the degree of the braking force request is generated, the braking-force-request-dependent control being executed after the time point when the degree of the braking force request becomes equal to the threshold degree.

In the vehicle brake system according to this form, the hydraulic brake device is provided for the one of the front wheel and the rear wheel, and the electric brake device is provided for the other of the front wheel and the rear wheel. The hydraulic brake device has the advantage of high reliability, and the electric brake device has the advantage of good response. According to this form, it is possible to construct the vehicle brake system that makes the best use of the advantages of the two brake devices.

According to this form, the electric brake device is configured to establish the clearance existing state in the non-request condition of the braking force, so that the drag phenomenon described above in the electric brake device is avoided or reduced. Thus, this form enables construction of a vehicle brake system with a small loss of a vehicle driving energy, namely, a brake system that improves fuel economy of the vehicle. There may be employed, as the means for establishing the clearance existing state, a means for retracting the piston to the set backward position by the electric motor at a time point when the braking force request becomes absent or a means for retracting the piston in dependence on a force of a biasing member such as a spring at a time point when the braking force request becomes absent.

According to this form, it is possible to execute the clearance removing control after generation of braking force request and before the hydraulic braking force is substantially generated, by utilizing good response of the electric brake device, so as to enable the timing of generation of the electric braking force to be appropriate with respect to the timing of generation of the hydraulic braking force.

The "braking force request" in this form may be determined based on a brake operation by a driver as explained below or may depend on a request for automatic brake made by a system for executing collision avoidance, automatic driving, or the like. Further, the braking force request may be a request for the braking force required for the vehicle as a whole, may be a request for a sum of: the braking force required for the hydraulic brake device: and the braking force required for the electric brake device, may be a request for the braking force required for the hydraulic brake device, or may be a request for the braking force required for the electric brake device. Accordingly, the "degree of the braking force request" may be a degree of a required overall braking force which is a braking force required by the vehicle as a whole, may be a degree of the sum of: a required hydraulic braking force which is a braking force required by the hydraulic brake device; and a required electric braking force which is a braking force required by the electric brake device, or may be a degree of one of the required hydraulic braking force and the required electric braking force. Specifically, the required overall braking force may be used for determining whether the degree of the braking force request has become equal to the threshold degree, the required hydraulic braking force may be used as the degree of the braking force request that should be satisfied in the braking-force-request-dependent control executed for the hydraulic brake device, and the required electric braking force may be used as the degree of the braking force request that should be satisfied in the braking-force-request-dependent control executed for the electric brake device.

Though the "clearance removing control" may be executed such that a certain clearance remains at the time point when the degree of the braking force request becomes equal to the threshold degree, it is preferable that the clearance be substantially removed at the time point. In other words, it is preferable that the clearance removing control be executed such that only an extremely slight clearance remains, and the threshold degree is preferably set so as to enable such a clearance removing control.

The configuration of the "hydraulic brake device" in this form is not limited to any particular configuration. For instance, the hydraulic brake device may be configured to assist, by a booster or the like, a brake operation force applied by a driver to a brake operation member. Alternatively, the hydraulic brake device may be configured to generate the hydraulic braking force in accordance with the braking force request by controlling a pressure of a working fluid supplied from a suitable high-pressure source, in dependence on the pressure of the working fluid without depending on the brake operation force. Each of the "hydraulic brake device" and the "electric brake device" is not limited to a disc brake in which a disc rotor functions as the rotary body and a brake pad functions as the friction member, but may be a drum brake in which an inner circumferential portion of a wheel or a drum functions as the rotary body and a shoe functions as the friction member.

(2) The vehicle brake system according to the form (1), wherein the threshold degree is set based on a hydraulic braking force delay which is a delay of substantial generation of the hydraulic braking force by the hydraulic brake device with respect to the generation of the braking force request.

Typically, the response of the electric brake device is good, as compared with the hydraulic brake device. According to this form, the timing of generation of the electric braking force after removal of the clearance can be set as desired with respect to the timing of generation of the hydraulic braking force. That is, the threshold degree can be set such that the timing of generation of the hydraulic braking force and the timing of generation of the electric braking force generally coincide with each other, for instance. By thus setting the threshold degree, it is possible to construct the vehicle brake system which is free from or less susceptible to an influence arising from a difference between the response of the hydraulic brake device and the response of the electric brake device.

(3) The vehicle brake system according to the form (1) or (2), wherein the clearance removing control is executed such that the piston is advanced at a speed that enables the clearance to be removed when the degree of the braking force request becomes equal to the threshold degree.

For instance, it may be possible to execute the clearance removing control such that the piston is advanced as fast as possible from the beginning of generation of the braking force request so as to quickly remove the clearance and to execute the braking-force-request-dependent control when the degree of the braking force request becomes equal to the threshold degree after the piston has once stopped advancing. In contrast, according to this form, the clearance removing control is executed such that the piston is advanced at a speed that enables the clearance to be removed at a time point of starting execution of the braking-force-request-dependent control, namely, at a necessary and sufficient speed. This form reduces a possibility that the piston is moved such that the piston is advanced and stopped, and thereafter advanced again. In other words, the piston is smoothly moved, making it possible to construct the vehicle brake system in which a load on devices for controlling and a load on the electric motor are small.

In a strict sense, this form is not limited to a form in which the clearance is removed just when the degree of the braking force request becomes equal to the threshold degree. Even if a slight clearance inevitably remains at the time point when the degree of the braking force request becomes equal to the threshold degree or even if the clearance is removed at a time point slightly before the degree of the braking force request becomes equal to the threshold degree, due to characteristics of the electric brake device, for instance, it is to be understood that such cases are included in this form. Conversely, a form in which a slight margin is set for the threshold degree to obviate such cases and the clearance removing control according to the concept of this form is executed is also included in this form.

(4) The vehicle brake system according to any one of the forms (1) through (3),
wherein the controller is configured to:
estimate, based on an increase gradient of the braking force request, a threshold time which is a time from the time point of generation of the braking force request to the time point when the degree of the braking force request becomes equal to the threshold degree; and
execute, for the electric brake device, the clearance removing control until the threshold time elapses and the braking-force-request-dependent control after the threshold time elapses.

In the case where the driver brakes suddenly, an increase gradient of the braking force request is large. As is easily understood from such a phenomenon, a time from the time point of generation of the braking force request to the time point when the degree of the braking force request equals to or reaches the threshold degree changes depending upon the increase gradient of the braking force request. In this form, the time is estimated as the threshold time, and the estimated threshold time is regarded as a time at which the degree of the braking force request will become equal to the threshold degree at a time point when the threshold time elapses from the time point of generation of the braking force request. Based on the estimated threshold time, the control for the electric brake device is executed. The estimation of the threshold time may be performed only once at the very beginning of the generation of the braking force request or may be performed a plurality of times so as to update the estimated threshold time as needed in the process of increase of the degree of the braking force request until the once estimated threshold time elapses.

The hydraulic braking force delay indicated above changes in accordance with the increase gradient of the braking force request. Specifically, the hydraulic braking force delay is larger when the increase gradient of the braking force request is small than when the increase gradient is large. That is, the hydraulic braking force delay becomes a longer time. In view of this, this form enables the electric braking force to be generated at appropriate timing in accordance with the hydraulic braking force delay.

This form is especially effective when combined with the form described above, namely, the form in which the clearance removing control is executed such that the piston is advanced at the speed that enables the clearance to be removed when the degree of the braking force request becomes equal to the threshold degree. According to the combination of the forms, it is possible to permit the advancing speed of the piston in the clearance removing control to be appropriate in accordance with the increase gradient of the braking force request.

(5) The vehicle brake system according to any one of the forms (1) through (4), further comprising a brake operation member to be operated by a driver,
wherein the controller is configured to determine the degree of the braking force request based on at least one of a brake operation amount which is an amount of operation of the brake operation member and a brake operation force which is a force applied to the brake operation member.

This form is suitable for a vehicle brake system configured to generate the braking force desired by the driver. Any known method may be employed to determine the degree of the braking force request based on both of the brake operation amount and the brake operation force. For instance, there may be employed a method in which the degree of the braking force request is determined based on a weighted sum of the brake operation amount and the brake operation force.

(6) The vehicle brake system according to the form (5),
wherein the hydraulic brake device includes: a wheel brake provided for the one of the front wheel and the rear wheel and configured to brake the one of the front wheel and the rear wheel being rotated; and a master cylinder to which the brake operation member is coupled, the master cylinder being for supplying the working fluid to the wheel brake, and
wherein the controller is configured to determine the brake operation force based on a pressure of the working fluid supplied from the master cylinder.

The hydraulic brake device typically includes the master cylinder configured to pressurize the working fluid in dependence on the brake operation force. Thus, a pressure of the working fluid pressurized by and supplied from the master cylinder, namely, a master pressure, is a suitable index of the brake operation force. According to this form, the brake operation force is determined utilizing the suitable index. A lot of hydraulic brake devices are equipped with a sensor for detecting the master pressure. Thus, by utilizing such a sensor, the brake operation force is easily determined without providing any additional equipment.

(7) The vehicle brake system according to the form (5) or (6), wherein the controller is configured to determine the degree of the braking force request based on both of the brake operation amount and the brake operation force before the degree of the braking force request becomes equal to the threshold degree and determine the degree of the braking force request based on the brake operation force after the degree of the braking force request becomes equal to the threshold degree.

Because of the structure of the brake operation member such as a brake pedal, the brake operation force indicates more accurately the braking force that the driver intends to generate, as compared with the brake operation amount. On the other hand, the brake operation amount indicates more accurately generation of the braking force request, as compared with the brake operation force. Those characteristics as to the brake operation amount and the brake operation force are conspicuous in determining the brake operation force based on the master pressure as described above. This form takes such characteristics into consideration. In short, this form is configured such that a parameter used for determining the degree of the braking force request is switched or changed depending on the degree of the braking force request. Owing to the configuration, it is possible to appropriately recognize the degree of the braking force request.

(8) The vehicle brake system according to any one of the forms (1) through (7), further comprising a regenerative brake device provided for at least one of the front wheel and the rear wheel and configured to generate a regenerative braking force utilizing electric power generation by rotation of the at least one of the front wheel and the rear wheel, wherein the controller is configured to control the operations of the hydraulic brake device and the electric brake device such that the hydraulic braking force and the electric braking force cover an insufficient braking force that cannot be covered by the regenerative braking force, the insufficient braking force being a shortage in an overall braking force required for the vehicle corresponding to the braking force request.

This form is suitable for the so-called hybrid vehicle (which may be also referred to as "hybrid drive vehicle"). The vehicle brake system equipped with the regenerative brake device is typically configured such that the regenerative braking force is generated with a higher priority than the hydraulic braking force and the electric braking force. In such a configuration, the degree of the braking force request for each of the hydraulic braking force and the electric braking force changes depending on the regenerative braking force to be generated. According to this form, the braking-force-request-dependent control can be appropriately executed, and the clearance removing control can be appropriately executed, irrespective of the change in the regenerative braking force.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
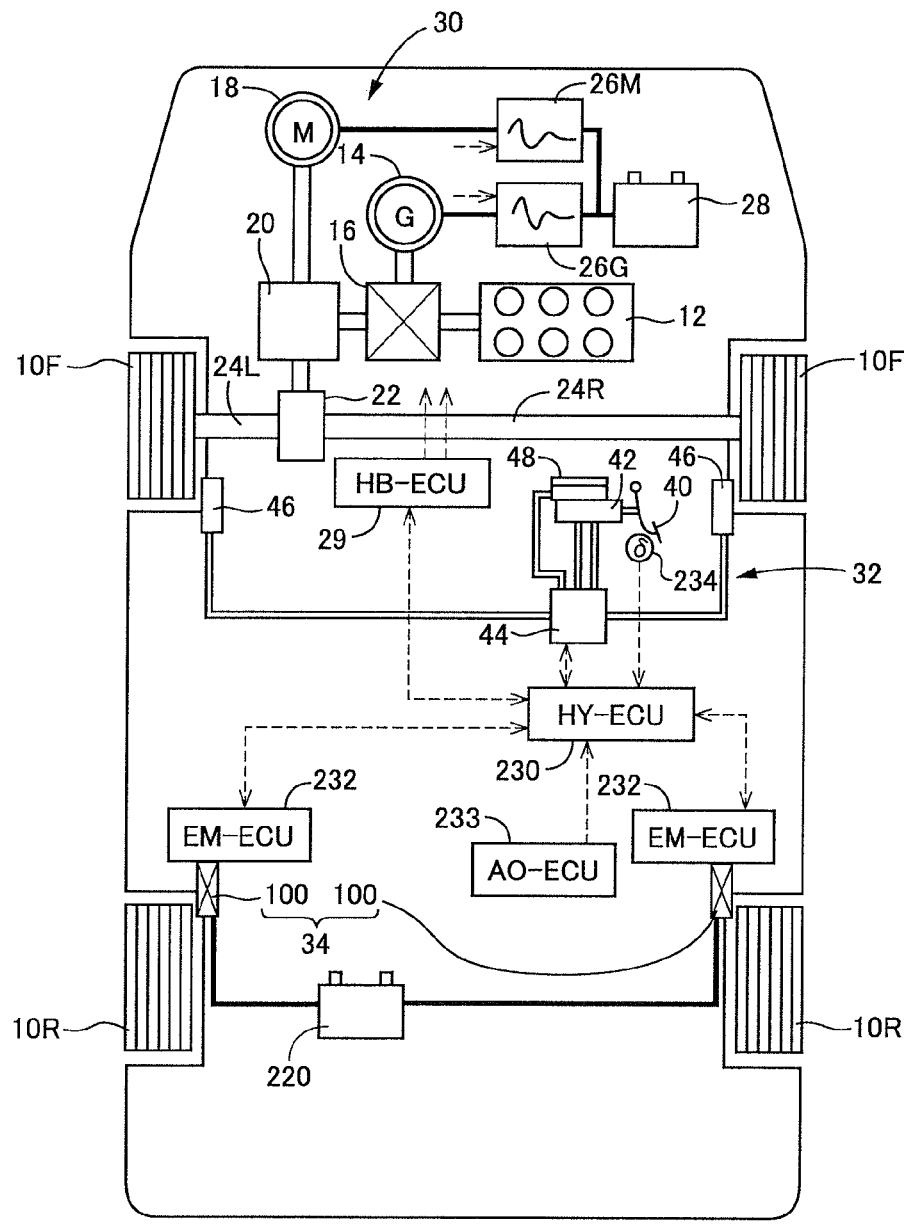
FIG. 1 is a view conceptually showing an overall structure of a vehicle brake system according to one embodiment.

Referring to the drawings, there will be explained below in detail a vehicle brake system according to one embodiment of the claimable invention. It is to be understood that the claimable invention is not limited to the details of the following embodiment but may be embodied based on the forms described in Forms of the Invention and may be changed and modified based on the knowledge of those skilled in the art.

[A] Outline of Vehicle Drive System and Vehicle Brake System

As schematically shown in FIG. 1, a vehicle on which a brake system according to one embodiment is installed is a hybrid vehicle having two front wheels 10F and two rear wheels 10R. The two front wheels 10F are drive wheels. A vehicle drive system will be first explained. The vehicle drive system installed on the vehicle includes an engine 12 as a drive source, a generator 14 that functions mainly as an electric generator, a power-distribution mechanism 16 to which the engine 12 and the generator 14 are coupled, and an electric motor 18 as another drive source.

The power-distribution mechanism 16 has a function of distributing rotation of the engine 12 to rotation of the generator 14 and rotation of an output shaft. The electric motor 18 is coupled to the output shaft via a reduction mechanism 20 functioning as a speed reducer. Rotation of the output shaft is transmitted to the front right and left wheels 10F via a differential mechanism 22 and respective drive shafts 24L, 24R, so that the front right and left wheels 10F are drivingly rotated. The generator 14 is coupled to a battery 28 via an inverter 26G. Electric energy obtained by electric power generation of the generator 14 is stored in the battery 28. The electric motor 18 is coupled to the battery 28 via an inverter 26M. The electric motor 18 and the generator 14 are controlled by controlling the inverter 26M and the inverter 26G, respectively. Management of a charged amount of the battery 28 and control of the inverter 26M and the inverter 26G are executed by a hybrid electronic control unit (hereinafter abbreviated as "HB-ECU" as shown in FIG. 1) 29 that includes a computer and drive circuits (drivers) for components of the vehicle drive system.

As schematically shown in FIG. 1, the vehicle brake system according to the embodiment installed on the vehicle includes (a) a regenerative brake device 30 configured to give a braking force to each of the two front wheels 10F, (b) a hydraulic brake device 32 configured to give a braking force to each of the two front wheels 10F, independently of the braking force given by the regenerative brake device 30, and (c) an electric brake device 34 configured to give a braking force to each of the two rear wheels 10R.

[B] Structure of Regenerative Brake Device

In terms of hardware, the regenerative brake device 30 constitutes a part of the vehicle drive system. When the vehicle decelerates, the electric motor 18 is rotated by rotation of the front wheels 10F without receiving a power supply from the battery 28. The electric motor 18 generates electric power utilizing an electromotive force generated by its rotation, and the generated electric power is stored, via the inverter 26M, in the battery 28 as a quantity of electricity (which may be also referred to as an electric quantity or an electric charge). That is, the electric motor 18 functions as an electric generator, so that the battery 28 is charged. The rotation of the front wheels 10F is decelerated, namely, the vehicle is decelerated, by a degree corresponding to energy that corresponds to the charged electric quantity. In the present vehicle, the regenerative brake device 30 is thus configured. The braking force given by the regenerative brake device 30 to the front wheels 10F (hereinafter referred to as "regenerative braking force" where appropriate) depends on the generated electric power, and the generated regenerative braking force is controlled by the control of the inverter 26M executed by the HB-ECU 29. A detailed explanation of the regenerative brake device 30 is dispensed with because any regenerative brake device having a known ordinary structure may be employed as the regenerative brake device 30.

[C] Structure of Hydraulic Brake Device i) Overall Structure

The hydraulic brake device 32 includes (a) a master cylinder 42 to which is connected a brake pedal 40, as a brake operation member, to be operated by a driver, (b) an actuator unit 44 configured to allow the working fluid from the master cylinder 42 to pass therethrough so as to supply the working fluid or configured to adjust the pressure of the working fluid pressurized by its pump (that will be explained) so as to supply the working fluid, and (c) a pair of wheel brakes 46 which are respectively provided for the front right and left wheels 10F and configured to decelerate rotation of the respective front right and left wheels 10F by the pressure of the working fluid supplied from the actuator unit 44. The hydraulic brake device 32 is a two-system device or tandem device corresponding to the front right and left wheels 10F.

ii) Structure of Master Cylinder

Figure 2:
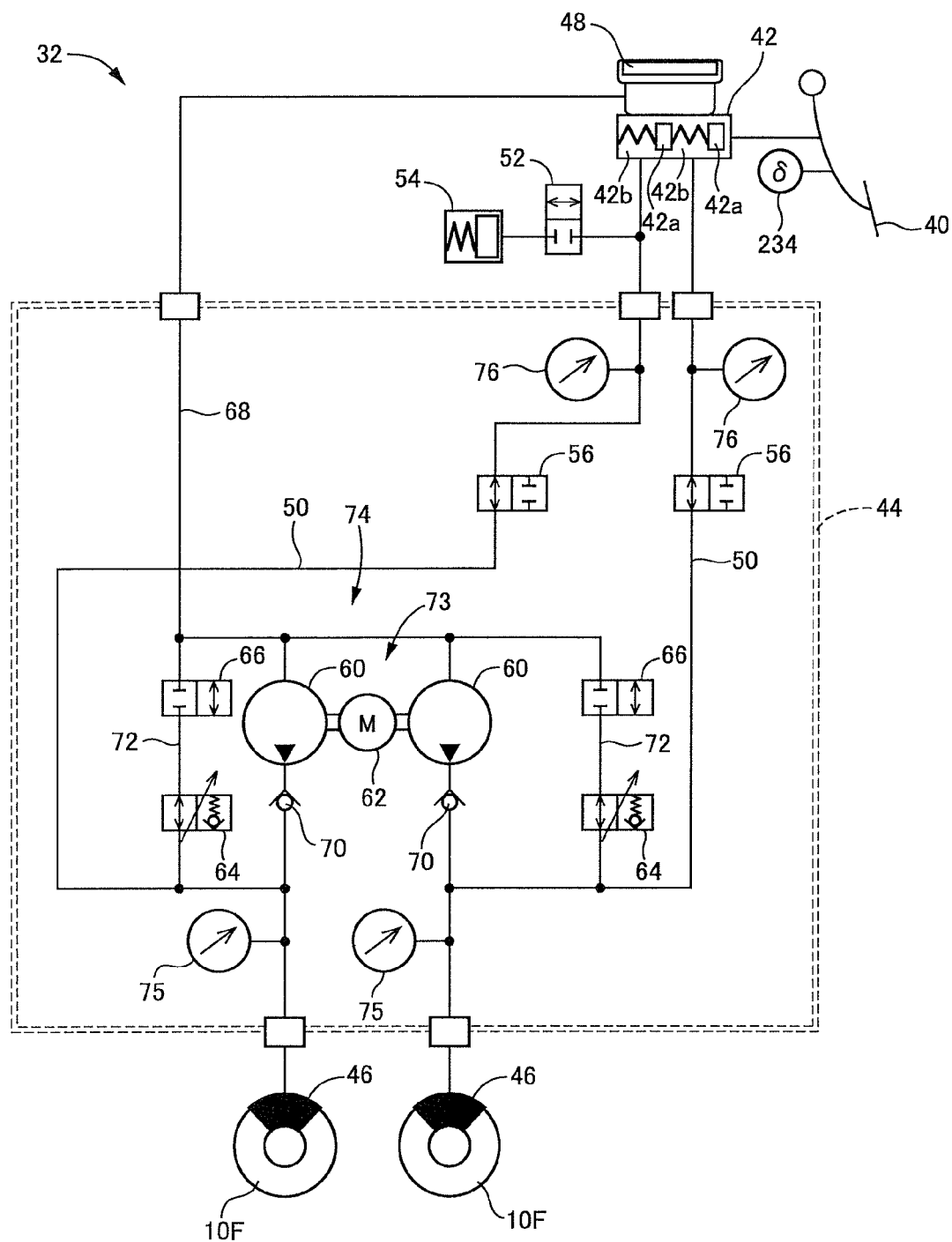
FIG. 2 is a hydraulic circuit diagram of a hydraulic brake device of the vehicle brake system shown in FIG. 1.

As shown in FIG. 2, the master cylinder 42 is a tandem cylinder device including, in a housing, two pistons 42a arranged in series and connected to the brake pedal 40, and two pressurizing chambers 42b in each of which the working fluid that has introduced thereinto is pressurized by a movement of a corresponding one of the pistons 42a. A reservoir 48, as a low-pressure source, is attached to the master cylinder 42. The reservoir 48 stores the working fluid at the atmospheric pressure. That is, the reservoir 48 is disposed near the master cylinder 42, and the working fluid from the reservoir 48 is pressurized in each of the two pressurizing chambers 42b. The master cylinder 42 is configured to supply, to the actuator unit 44, the working fluid whose pressure corresponds to a force applied to the brake pedal 40 (hereinafter referred to as "brake operation force" where appropriate), for the respective two systems that correspond to the respective two front wheels 10F. Specifically, the actuator unit 44 has fluid passages through which the working fluid supplied from the master cylinder 42 flows toward the respective wheel brakes 46. In other words, the hydraulic brake device 32 has a pair of master fluid passages 50 which are partly defined by the two fluid passages and through which the working fluid is supplied from the master cylinder 42 to the respective wheel brakes 46. That is, in the hydraulic brake device 32, the working fluid can be supplied from the master cylinder 42 to the wheel brakes 46 via the respective master fluid passages 50. Each of the wheel brakes 46 has a wheel cylinder (that will be explained), and the working fluid is supplied to the wheel cylinder.

To one of the two master fluid passages 50, a stroke simulator 54 is connected via a simulator opening valve 52 which is a normally-closed electromagnetic open/close valve. (The normally-closed electromagnetic open/close valve is a valve which is in a valve closed state when not energized.) In a normal condition (which may be also referred to as a normal operating condition) in which no electric failure is occurring, the simulator opening valve 52 is energized into a valve open state, so that the stroke simulator 54 works. As explained below, in the normal condition, a pair of master cut valves (master shut-off valves) 56, which are two electromagnetic open/close valves and which are provided in the actuator unit 44 so as to correspond to the respective two systems, are placed in the valve closed state, so that the stroke simulator 54 permits a depression stroke of the brake pedal 40 and gives, to the brake pedal 40, an operation reaction force in accordance with the depression stroke. That is, the stroke simulator 54 has a function of ensuring a feeling of the brake operation in the normal condition. The stroke simulator 54 in the present embodiment has a known structure. For instance, the stroke simulator 54 includes: a fluid chamber which communicates with one of the master fluid passages 50 and whose volume is variable; and an elastic body configured to apply, to the working fluid in the fluid chamber, a force in accordance with an increase amount of the volume in the fluid chamber. Thus, the stroke simulator 54 is not explained in detail here.

iii) Structure of Actuator Unit

The actuator unit 44 includes: the two master cut valves 56, each as a normally-opened electromagnetic open/close valve, configured to shut off flows of the working fluid through the respective two master fluid passages 50 (The normally-opened electromagnetic open/close valve is a valve which is in a valve open state when not energized); a pair of pumps 60 which correspond to the respective two systems; a motor 62 for driving the pumps 60; a pair of pressure holdings valve 64, each as an electromagnetic linear valve (electromagnetic control valve), which correspond to the respective two systems; and a pair of opening valves 66, each as a normally-closed electromagnetic open/close valve, which are disposed in series with the respective pressure holding valves 64. In the hydraulic brake device 32, only one reservoir is provided, and the two pumps 60 are configured to pump up the working fluid from the reservoir 48. To this end, there is formed a reservoir fluid passage 68 that connects the two pumps 60 and the reservoir 48, and a part of the reservoir fluid passage 68 is located in the actuator unit 44. Each of the pumps 60 is connected to the corresponding master fluid passage 50 on its ejection side and supplies, to the corresponding wheel brake 46, the pressurized working fluid via a part of the master fluid passage 50. On the ejection side of each of the pumps 60, a check valve 70 is provided for preventing a backflow of the working fluid to the pump 60. A pair of return fluid passages 72 are formed in the actuator unit 44 so as to correspond to the two systems. Each of the return passages 72 is formed in parallel with the corresponding pump 60 so as to connect the corresponding master fluid passage 50 and the reservoir fluid passage 68. In each of the return fluid passages 72, the pressure holding valve 64 and the opening valve 66 are provided. Each opening valve 66 is a valve for opening the corresponding return fluid passage 72. Accordingly, the opening valve 66 will be referred to as "return passage opening valve 66" where appropriate. Conversely, the opening valve 66 is a valve that closes the return fluid passage 72 in its non-energized state. Accordingly, the opening valve 66 may be regarded as a shut-off valve. In the actuator unit 44, the two pumps 60 and the motor 62 constitute one pump device 73 functioning as a high-pressure source. Further, a controlled fluid pressure supply device 74 is constituted by the pump device 73, the reservoir fluid passage 68 connected to the reservoir 48 not via the master cylinder 42, the two return fluid passages 72, the two pressure holding valves 64, and the two return passage opening valves 66. The controlled fluid pressure supply device 74 is configured to supply, to the wheel brakes 46, the working fluid from the pump device 73 while controlling the pressure of the working fluid.

In the actuator unit 44, a pair of wheel cylinder pressure sensors 75 and a pair of master pressure sensors 76 are provided so as to correspond to the two systems. Each wheel cylinder pressure sensor 75 is configured to detect the pressure of the working fluid supplied to the corresponding wheel brake 46 (hereinafter referred to as "wheel cylinder pressure" where appropriate). Each master pressure sensor 76 is configured to detect the pressure of the working fluid supplied from the master cylinder 42 (hereinafter referred to as "master pressure" where appropriate).

iv) Structure of Wheel Brake

Figure 3:
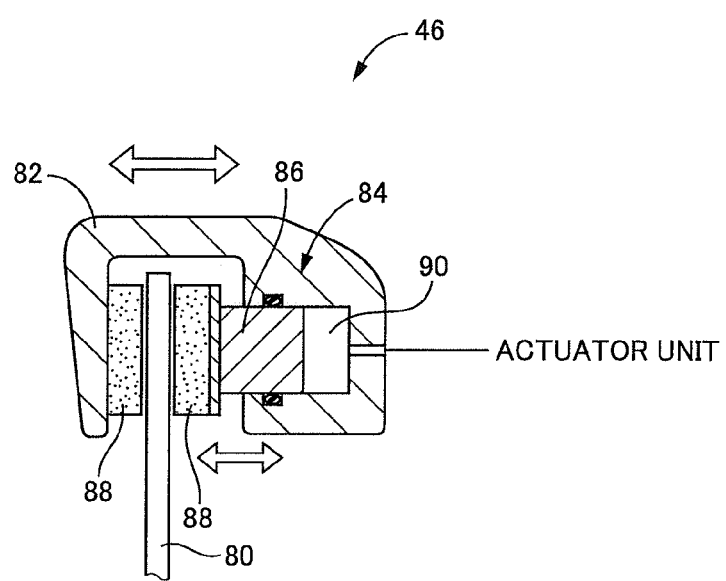
FIG. 3 is a cross-sectional view of a wheel brake of the hydraulic brake device of the vehicle brake system shown in FIG. 1.

Each wheel brake 46 for stopping rotation of the corresponding front wheel 10F is a disc brake device schematically shown in FIG. 3. Each wheel brake 46 includes a disc rotor 80, as a rotary body, configured to rotate together with the corresponding front wheel 10F and a caliper 82 movably supported by a carrier that rotatably holds the front wheel 10F. The caliper 82 incorporates a wheel cylinder 84 whose housing is defined by a part of the caliper 82. A pair of brake pads 88, each as a friction member, is provided such that one brake pad 88 is attached to and held by a distal end of a piston 86 of the wheel cylinder 84 and the other brake pad 88 is attached to and held by a portion of the caliper 82 located opposite to a portion thereof in which the wheel cylinder 84 is incorporated. Thus, the two brake pads 88 are opposed to each other with the disc rotor 80 interposed therebetween.

The working fluid is supplied from the actuator unit 44 to a fluid chamber 90 of the wheel cylinder 84, and the pressure of the working fluid causes the brake pads 88 to nip the disc rotor 80 therebetween. That is, the wheel cylinder 84 is operated to cause the brake pads 88 to be pushed onto the disc rotor 80. Thus, each wheel brake 46 generates, utilizing a friction force, a braking force to stop rotation of the corresponding front wheel 10F, i.e., a braking force to brake the vehicle (hereinafter referred to as "hydraulic braking force" where appropriate). The hydraulic braking force has a magnitude in accordance with the pressure of the working fluid supplied from the actuator unit 44. The wheel brakes 46 have a known ordinary structure, and a detailed explanation thereof is dispensed with.

[D] Structure of Electric Brake Device

Figure 4:
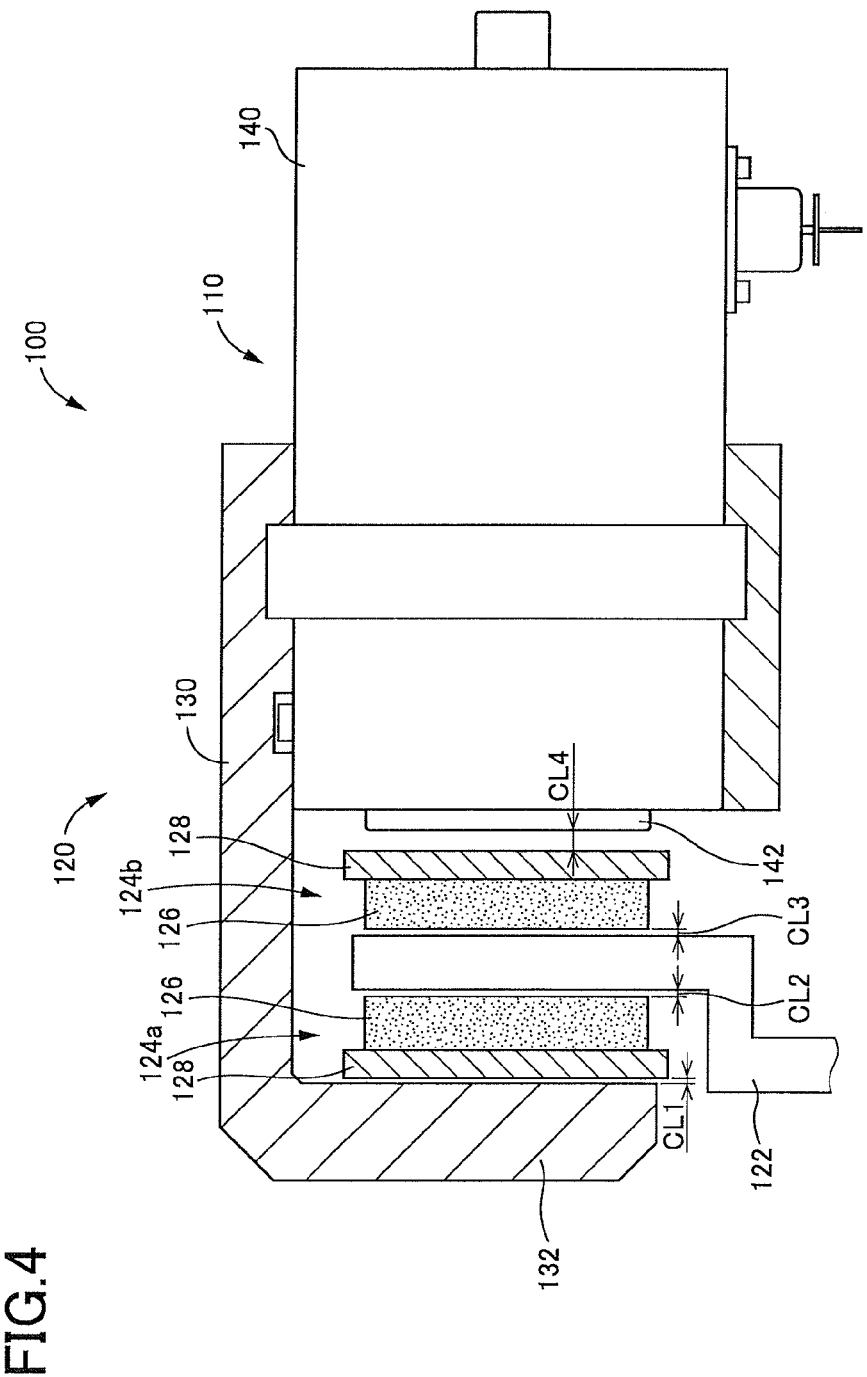
FIG. 4 is a cross-sectional view of a wheel brake of an electric brake device of the vehicle brake system shown in FIG. 1.

As shown in FIG. 1, the electric brake device 34 includes a pair of wheel brakes 100 for stopping rotation of the corresponding rear wheels 10R. Each of the wheel brakes 100 may be referred to as "electric brake device". As shown in FIG. 4, each wheel brake 100 includes: a brake caliper 120 (hereinafter simply referred to as "caliper 120" where appropriate) in which an electric brake actuator 110 (hereinafter simply referred to as "actuator 110" where appropriate) is disposed as a principal constituent element; and a disc rotor 122, as a rotary body, configured to rotate together with the corresponding wheel (i.e., the rear wheel in the present embodiment).

i) Structure of Brake Caliper

The caliper 120 is held by a mount (not shown) provided in a carrier (not shown) that rotatably holds the corresponding wheel, such that the caliper 120 is movable in the axial direction, i.e., the right-left direction in FIG. 4 and such that the caliper 120 extends across over the disc rotor 122. A pair of brake pads (hereinafter simply referred to as "pads" where appropriate) 124a, 124b are held by the mount so as to sandwich the disc rotor 122 therebetween in a state in which the pads 124a, 124b are movable in the axial direction. Each of the pads 124a, 124b includes a friction member 126 disposed on one side thereof on which the pad 124a, 124b comes into contact with the disc rotor 122 and a backup plate 128 supporting the friction member 126.

For the sake of convenience, a left side and a right side in FIG. 4 are defined as a front side and a right side, respectively. The pad 124a located on the front side is supported by a front end portion (claw portion) 132 of a caliper main body 130. The actuator 110 is held by a rear-side portion of the caliper main body 130 such that a housing 140 of the actuator 110 is fixed to the rear-side portion of the caliper main body 130. The actuator 110 includes a piston 142 configured to advance and retract relative to the housing 140. When the piston 142 advances, a front end portion, namely, a front end, of the piston 142 comes into engagement with the rear-side pad 124b, specifically, comes into engagement with the backup plate 128 of the pad 124b. When the piston 142 further advances while being kept engaged with the backup plate 128 of the pad 124b, the pair of pads 124a, 124b sandwich or nip the disc rotor 122 therebetween. In other words, the friction members 126 of the respective pads 124a, 124b are pushed onto the disc rotor 122. Owing to the pushing of the friction members 126 of the pads 124a, 124b onto the disc rotor 122, there is generated a braking force for stopping rotation of the wheel that depends on a friction force between the disc rotor 122 and the friction members 126, namely, there is generated a braking force for reducing the speed of the vehicle or stopping the vehicle.

ii) Structure of Electric Brake Actuator

Figure 5:
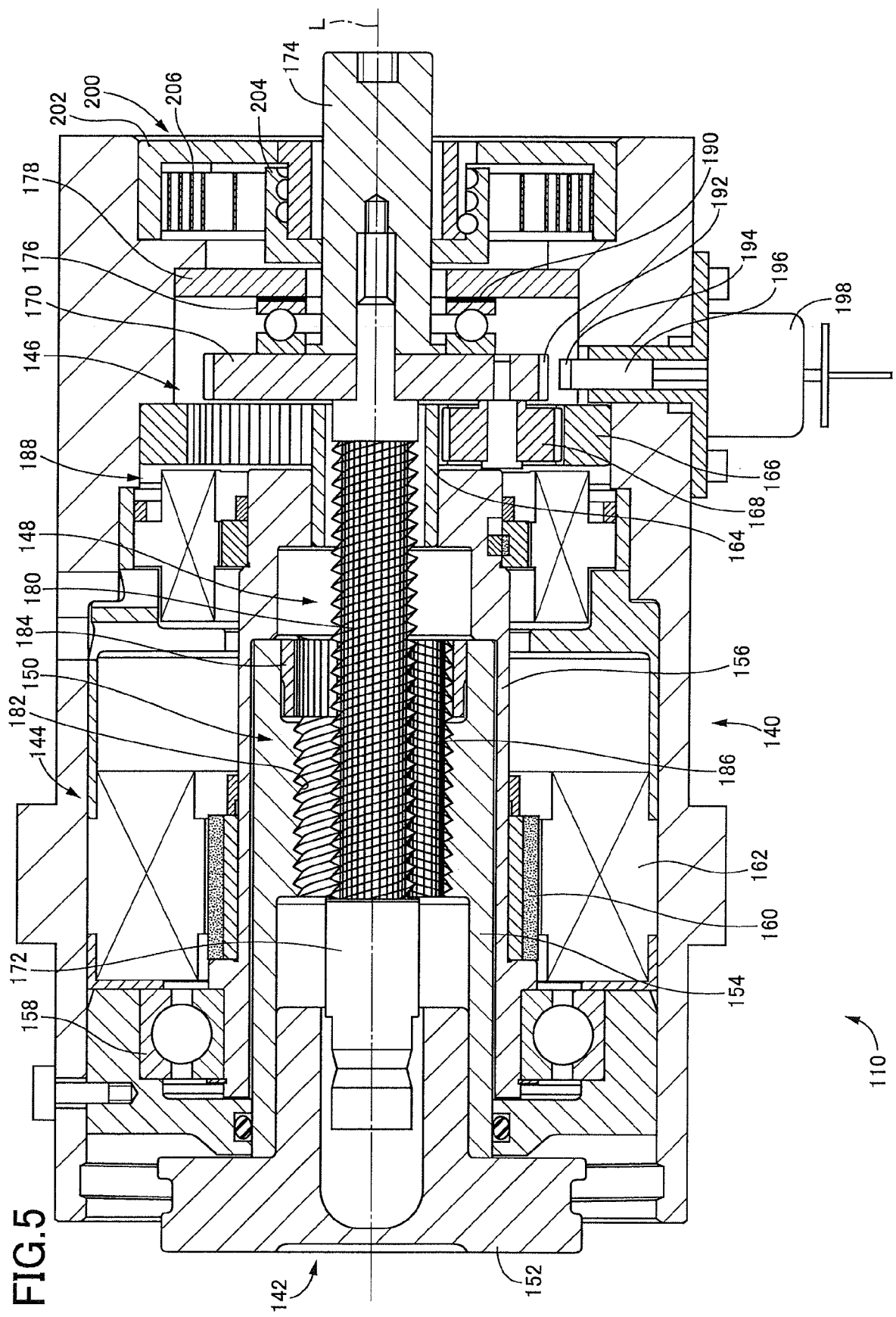
FIG. 5 is a cross-sectional view of an electric brake actuator of the wheel brake shown in FIG. 4.

As shown in FIG. 5, the actuator 110 includes the housing 140, the piston 142, an electric motor 144 as a drive source, a speed reducer 146 for decelerating rotation of the electric motor 144, an input shaft 148 configured to be rotated by the rotation of the electric motor 144 decelerated by the speed reducer 146, and a motion converting mechanism 150 configured to convert the rotating motion of the input shaft 148 into the advancing and retracting movement of the piston 142. In the following explanation, a left side and a right side in FIG. 5 will be respectively referred to as a front side and a rear side, for convenience sake.

The piston 142 includes a piston head 152 and an output sleeve 154 which is a hollow cylindrical portion of the piston 142. The electric motor 144 includes a cylindrical rotary drive shaft 156. The output sleeve 154 is disposed in the rotary drive shaft 156, and the input shaft 148 is disposed in the output sleeve 154, such that the output sleeve 154, the rotary drive shaft 156, and the input shaft 148 are coaxial relative to each other, specifically, such that respective axes of the rotary drive shaft 156, the output sleeve 154, and the input shaft 148 coincide with an axis L common thereto. Thus, the actuator 110 is compact in size.

The rotary drive shaft 156 is held by the housing 140 via a radial bearing 158 so as to be rotatable and immovable in an axial direction (which is a direction of extension of the axis L and coincides with the right-left direction in FIG. 5). The electric motor 144 includes magnets 160 disposed on one circumference of an outer circumferential portion of the rotary drive shaft 156 and coils 162 fixed to an inner circumferential portion of the housing 140 so as to surround the magnets 160.

The speed reducer 146 is of a planetary gear type including a hollow sun gear 164 attached and fixed to a rear end of the rotary drive shaft 156, a ring gear 166 fixed to the housing 140, a plurality of planetary gears 168 (only one of which is illustrated in FIG. 5) engaging with both of the sun gear 164 and the ring gear 166 so as to revolve about the sun gear 164. Each of the planetary gears 168 is rotatably held by a flange 170 as a carrier. The input shaft 148 includes a front-side shaft 172 that constitutes a front-side portion of the input shaft 148 and a rear-side shaft 174 that constitutes a rear-side portion of the input shaft 148, the front-side shaft 172 and the rear-side shaft 174 being threadedly engaged with each other. The flange 170 is sandwiched between and fixed by the front-side shaft 172 and the rear-side shaft 174, whereby the flange 170 rotates together with the front-side shaft 172 and the rear-side shaft 174, namely, rotates together with the input shaft 148. The rotation of the rotary drive shaft 156, namely, the rotation of the electric motor 144, is decelerated by the speed reducer 146 and transmitted as the rotation of the input shaft 148. The input shaft 148 is held by the housing 140 via the flange 170, a thrust bearing 176, and a support plate 178, so as to be rotatable and immovable in the axial direction.

The motion converting mechanism 150 is constituted by: an externally threaded and toothed portion 180 which is provided on an outer circumferential portion of the front-side shaft 172 of the input shaft 148 and on which external threads and external teeth are formed; an internally threaded portion 182 which is provided in the output sleeve 154 of the piston 142 and on which internal threads are formed; a ring gear 184 which is inserted into and fixed to a rear end portion of the output sleeve 154 and on which internal teeth are formed; and a plurality of planetary rollers 186 (only one of which is illustrated in FIG. 5) provided between the outer circumferential portion of the front-side shaft 172 and an inner circumferential portion of the output sleeve 154. External threads and external teeth, which are similar to those formed on the outer circumferential portion of the front-side shaft 172, are formed on an outer circumferential portion of each planetary roller 186. In all of the externally threaded and toothed portion 180 of the front-side shaft 172 and the planetary rollers 186, the external teeth are formed over the entirety of the area in which the external threads are formed. Thus, it seems that a texture is formed on the outer circumferential surfaces.

The external teeth of each planetary roller 186 are held in engagement with the external teeth of the externally threaded and toothed portion 180 of the front-side shaft 172 and the internal teeth of the ring gear 184. The external threads of each planetary roller 186 are threadedly engaged with the external threads of the externally threaded and toothed portion 180 of the front-side shaft 172 and the internal threads of the internally threaded portion 182 of the output sleeve 154. The pitch of the external threads of the externally threaded and toothed portion 180, the pitch of the external threads of the planetary roller 186, and the pitch of the internal threads of the internally threaded portion 182 are mutually the same while the number of external threads of the externally threaded and toothed portion 180, the number of external threads of the planetary roller 186, and the number of internal threads of the internally threaded portion 182 are mutually different.

The motion converting mechanism 150 is known in the art, and its structure and operating principle are explained in detail in Japanese Patent Application Publication No. 2007-56952, for instance. Thus, the motion converting mechanism 150 will be briefly explained. Roughly speaking, in the motion converting mechanism 150, a ratio of the number of external teeth of each planetary roller 186 and the number of internal teeth of the ring gear 184 is equal to a ratio of the number of external threads of the planetary roller 186 and the number of internal threads of the internally threaded portion 182 of the output sleeve 154 whereas a ratio of the number of external teeth of the planetary roller 186 and the number of external teeth of the externally threaded and toothed portion 180 of the front-side shaft 172 is different from a ratio of the number of external threads of the planetary roller 186 and the number of external threads of the externally threaded and toothed portion 180 of the front-side shaft 172. That is, there exists a difference in motions between the planetary roller 186 and the front-side shaft 172.

The piston 142 is inhibited from rotating about the axis, that is, the output sleeve 154 is inhibited from rotating about the axis. When the input shaft 148 rotates, the planetary rollers 186 revolve about the front-side shaft 172 of the input shaft 148 while rotating. On this occasion, the planetary rollers 186 and the output sleeve 154 do not move relative to each other in the axial direction, and the planetary rollers 186 and the input shaft 148 move relative to each other in the axial direction, based on the relationship between the ratio of the number of teeth and the ratio of the number of threads. That is, the piston 142 and the planetary rollers 186 move as a unit in the axial direction relative to the input shaft 148, based on the difference in motions thereof.

As apparent from the explanation, in the actuator 110, the rotation of the electric motor 144 causes the piston 142 to be advanced or retracted. FIG. 5 shows a state in which the piston 142 is positioned at the rearmost position in its movable range (hereinafter referred to as "set backward position" where appropriate). Specifically, when the electric motor 144 rotates forwardly from this state, the piston 142 is advanced, and, as apparent from FIG. 4, the pads 124a, 124b are pushed onto the disc rotor 122 with the front end of the piston 142 held in engagement with the pad 124b, so that the braking force is generated. In this respect, the magnitude of the braking force corresponds to an electric current supplied to the electric motor 144. Subsequently, when the electric motor 144 rotates reversely, the piston 142 is retracted, and the piston 142 and the pad 124b are accordingly disengaged from each other, so that the braking force is not generated. Finally, the piston 142 returns to the set backward position shown in FIG. 5.

In addition to the constituent components described above, the actuator 110 includes a resolver 188 for detecting a rotation angle of the electric motor 144. The resolver 188 functions as a motor rotation angle sensor. Based on a detection signal of the resolver 188, the position and the movement amount of the piston 142 in the axial direction can be detected. Further, there is disposed, between the support plate 178 and the thrust bearing 176, an axial-force sensor 190 (as a load cell) for detecting a force in a thrust direction acting on the input shaft 148, namely, an axial force. The axial force corresponds to a force by which the piston 142 pushes the brake pad 124b onto the disc rotor 122. Based on a detected value of the axial-force sensor 190, it is possible to detect the braking force being generated by the wheel brake 100, i.e., by the electric brake device 34.

The actuator 110 further includes a mechanism configured to inhibit the rotation of the input shaft 148 for allowing the electric brake device 34 to operate as an electric parking brake. Specifically, ratchet teeth 192 are formed on an outer circumferential portion of the flange 170, and there are provided: a plunger 196 having, at its distal end, a locking pawl 194 for locking the ratchet teeth 192; and a solenoid 198 fixed to the outer circumferential portion of the housing 140 for advancing and retracting the plunger 196. When the electric motor 144 rotates forwardly in a state in which the solenoid 198 is energized to permit the plunger 196 to protrude, the locking pawl 194 locks the ratchet teeth 192. Thus, the piston 142 is inhibited from being retracted even when the solenoid 198 is deenergized thereafter. For cancelling the locking by the locking pawl 194, the electric motor 144 is rotated forwardly with the solenoid 198 kept deenergized.

In the case where the supply of the electric current to the electric motor 144 is cut off in a state in which the piston 142 has been advanced and the braking force is being generated, the piston 142 cannot be retracted, and the braking force is kept generated. In view of such a situation, the actuator 110 includes a mechanism for retracting the piston 142 by an elastic force of an elastic member. In the motion converting mechanism 150, however, the negative (reverse) efficiency (that is efficiency when the input shaft 148 is rotated by the advancing and retracting movement of the piston 142) is smaller than the positive (forward) efficiency (that is efficiency when the piston 142 is advanced and retracted by the rotation of the input shaft 148). In view of this, the actuator 110 includes, as the mechanism, a biasing mechanism 200 configured to give, to the input shaft 148, a rotational biasing force (which may be referred to as "rotational torque") in a direction in which the piston 142 is retracted.

Figure 6A:
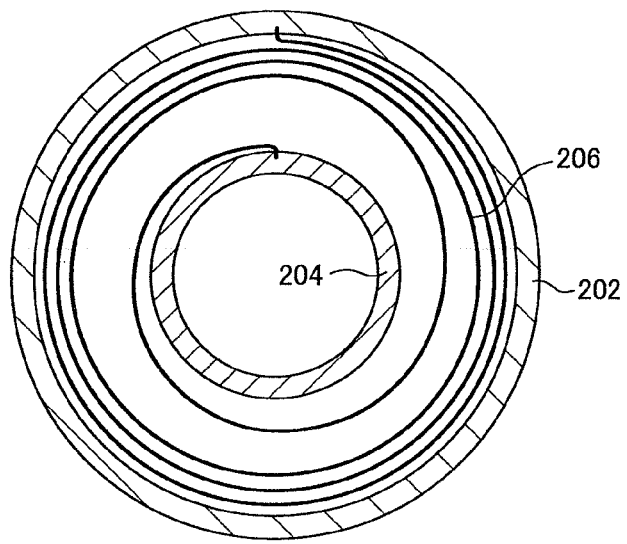
FIG. 6A is a view for explaining a biasing mechanism of the electric brake actuator shown in FIG. 5.
Figure 6B:
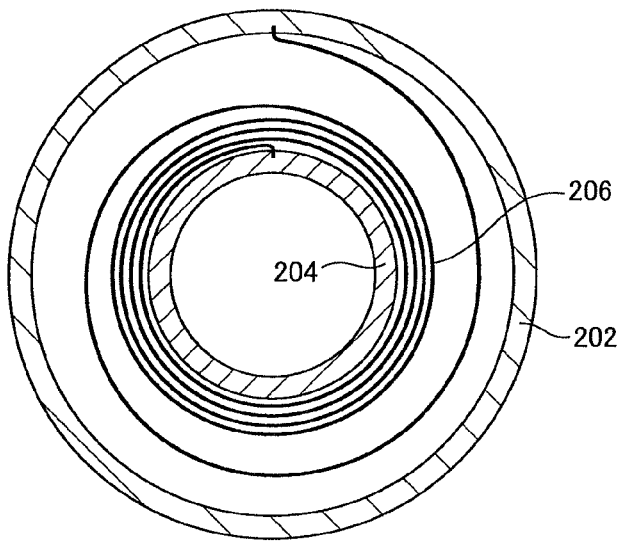
FIG. 6B is a view for explaining the biasing mechanism of the electric brake actuator shown in FIG. 5.

Specifically, the biasing mechanism 200 is constituted by an outer ring 202 fixed to the housing 140, an inner ring 204 fixed to the rear-side shaft 174 of the input shaft 148 so as to rotate therewith and disposed on an inner side of the outer ring 202, and a spiral spring 206, as the elastic member, disposed between an inner circumferential surface of the outer ring 202 and an outer circumferential surface of the inner ring 204. In a state of FIG. 5, namely, in a state in which the piston 142 is positioned at the set backward position indicated above, the spiral spring 206 is not substantially elastically deformed as shown in FIG. 6A, and the spiral spring 206 does not substantially generate the elastic force. Subsequently, as the input shaft 148 is rotated by the electric motor 144 and the piston 142 is accordingly advanced, the spiral spring 206 is gradually wound and contracted as shown in FIG. 6B, so as to generate the elastic force. That is, the elastic force whose magnitude corresponds to an amount of the advancing movement of the piston 142 that has been advanced from the set backward position acts on the input shaft 148 as a biasing force against the advancing movement of the piston 142, namely, as a biasing force in a direction in which the piston 142 is retracted. In other words, the biasing force that acts on the input shaft 148 by the spiral spring 206 increases as the piston 142 is advanced further. The rotational biasing force enables the piston 142 to be retracted even in the case where the piston 142 cannot be retracted by the electric motor 144 in the state in which the piston 142 has been advanced and the braking force is being generated.

According to the configuration explained above, each wheel brake 100 of the electric brake device 34 generates, utilizing a friction force, a braking force to stop rotation of the corresponding rear wheel 10R, namely, a braking force to brake the vehicle (hereinafter referred to as "electric braking force" where appropriate). As shown in FIG. 1, electric current is supplied to the electric motor 144 of each wheel brake 100 from an auxiliary battery 220 different from the battery 28.

[E] Basic Control of Vehicle Brake System
i) Control System

Control of the vehicle brake system, namely, control of a braking force F, is executed by a control system shown in FIG. 1. (Hereinafter, respective braking forces are collectively referred to as "braking force F" where appropriate.) Specifically, the hydraulic brake device 32 is controlled by the electronic control unit for the hydraulic brake device, i.e., the HY-ECU 230. The electric brake device 34 is controlled by two electronic control units for the electric brake device (hereinafter each abbreviated as "EM-ECU" where appropriate) 232 provided for the respective wheel brakes 100. The HY-ECU 230 includes a computer and drivers (drive circuits) for components of the hydraulic brake device 32. Each of the EM-ECUs 232 includes a computer and drivers (drive circuits) for components of the electric brake device 34. As explained above, the regenerative brake device 30 is controlled by the HB-ECU 29.

More specifically, the HB-ECU 29 controls the inverters 26G, 26M that constitute the regenerative brake device 30. The HY-ECU 230 controls the master cut valves 56, the pressure holding valves 64, the return passage opening valves 66, and the motor 62 of the pump device 73 included in the actuator unit 44 that constitutes the hydraulic brake device 32. The EM-ECUs 232 control the electric motors 114 of the wheel brakes 100 that constitute the electric brake device 34. Thus, the regenerative braking force $F_{RG}$, the hydraulic braking force $F_{HY}$, and the electric braking force $F_{EM}$ are controlled. Consequently, an overall braking force $F_{SUM}$, which is the braking force F to be given to the vehicle as a whole, is controlled. In the vehicle brake system, the HB-ECU 29, the HY-ECU 230, and the EM-ECUs 232 are connected to one another by a network in the vehicle (CAN) and execute the respective controls while performing communication with one another. As later explained, the HY-ECU 230 functions, in the vehicle brake system, as a main electronic control unit that also controls the HB-ECU 29 and the EM-ECUs 232.

The vehicle on which the present vehicle brake system is installed is capable of executing automated or autonomous driving following a preceding vehicle which is running ahead of the own vehicle or capable of avoiding a collision of the own vehicle. That is, an automatic driving operation of the vehicle is executable, and there is installed, on the vehicle, an electronic control unit for vehicle automatic driving operation (hereinafter referred to as "AO-ECU" where appropriate) 233 which controls the automatic driving operation of the vehicle. In the automatic driving operation, a brake request which is not based on an intention of the driver, namely, a request for the automatic brake, is made when a distance between the own vehicle and the preceding vehicle is shortened or when a possibility of collision with an obstacle becomes high. The request is transmitted from the AO-ECU 233 to the HY-ECU 230 as a signal as to the overall braking force $F_{SUM}$ to be required (which will be explained). It may be considered that a controller of the vehicle brake system is constituted by the HB-ECU 29, the HY-ECU 230, the EM-ECUs 232, and the AO-ECU 233.

ii) Basic Control of Braking Force

Basic control of the braking force in the present vehicle brake system, namely, control in the normal condition, is executed in the following manner. The electric brake device 34 includes the two wheel brakes 100, and the two EM-ECUs 232 are respectively provided for the two wheel brakes 100. For simplification of explanation, the two wheel brakes 100 are treated as one wheel brake, and the two EM-ECUs 232 are treated as one EM-ECU 232. In the normal condition, the master cut valves 56 disposed in the actuator unit 44 of the hydraulic brake device 32 are closed. Thus, a master pressure $P_M$ detected by the master pressure sensor 76 indicates a pressure that depends on a spring constant of the elastic body of the stroke simulator 54, namely, a brake operation force a which is the operation force applied to the brake pedal 40 by the driver. Initially, a required overall braking force $F_{SUM}*$, which is a braking force F required for the vehicle as a whole (i.e., a sum of the braking forces F to be given to the four wheels 10), is determined based on the brake operation force σ, specifically, based on the detected master pressure $P_M$. Specifically, the required overall braking force $F_{SUM}*$ is obtained by multiplying the master pressure $P_M$ by an operation-force-dependent gain $\alpha_\sigma$. The brake operation force σ is one example of an operation value indicative of a degree of the operation of the brake pedal 40, namely, indicative of a degree of the brake operation. The brake operation force σ may be considered as a parameter indicative of the required overall braking force $F_{SUM}*$.

In an instance where the automatic brake is necessary, the AO-ECU 233 determines the required overall braking force $F_{SUM}*$, and information as to the determined required overall braking force $F_{SUM}*$ is sent from the AO-ECU 233 to the HY-ECU 230. In this instance, the HY-ECU 230 executes the processing described below based on the required overall braking force $F_{SUM}*$ based on the information.

In the present vehicle brake system, the regenerative braking force $F_{RG}$ is preferentially generated, and the hydraulic braking force $F_{HY}$ and the electric braking force $F_{EM}$ cover a shortage in the required overall braking force $F_{SUM}*$ that cannot be covered by the regenerative braking force $F_{RG}$. The shortage will be hereinafter referred to as an insufficient braking force $F_{IS}$. Each of the regenerative braking force $F_{RG}$, the hydraulic braking force $F_{HY}$, and the electric braking force $F_{EM}$ corresponds to a sum of the braking forces F to be given to the two wheels 10, i.e., two front wheels 10F or two rear wheels 10R, by a corresponding one of the regenerative brake device 30, the hydraulic brake device 32, and the electric brake device 34. Actually, there are given, to each of the two front wheels 10F or each of the two rear wheels 10R, a half of the regenerative braking force $F_{RG}$, a half of the hydraulic braking force $F_{HY}$, and a half of the electric braking force $F_{EM}$, in the normal condition.

A signal as to the required overall braking force $F_{SUM}*$ is sent from the HY-ECU 230 to the HB-ECU 29, and the HB-ECU 29 determines a target regenerative braking force $F_{RG}*$ as a maximum regenerative braking force $F_{RG}$ that can be generated within a range not beyond the required overall braking force $F_{SUM}*$. A signal as to the target regenerative braking force $F_{RG}*$ is returned to the HY-ECU 230 from the HB-ECU 29.

Subsequently, the HY-ECU 230 determines the insufficient braking force $F_{IS}$ by subtracting the target regenerative braking force $F_{RG}*$ from the required overall braking force $F_{SUM}*$. To cover the insufficient braking force $F_{IS}$ by the hydraulic braking force $F_{HY}$ and the electric braking force $F_{EM}$, specifically, to cover the insufficient braking force $F_{IS}$ such that a ratio between the hydraulic braking force $F_{HY}$ and the electric braking force $F_{EM}$ becomes equal to a set distribution ratio ($\beta_{HY}:\beta_{EM}$), the HY-ECU 230 multiplies the insufficient braking force $F_{IS}$ by a hydraulic braking force distribution coefficient $\beta_{HY}$ and an electric braking force distribution coefficient $\beta_{EM}$ ($\beta_{HY}+\beta_{EM}=1$), respectively, so as to determine a target hydraulic braking force $F_{HY}*$ as the hydraulic braking force $F_{HY}$ to be generated and a target electric braking force $F_{EM}*$ as the electric braking force $F_{EM}$ to be generated. A signal as to the target electric braking force $F_{EM}*$ is sent from the HY-ECU 230 to the EM-ECU 232.

The regenerative brake device 30, the hydraulic brake device 32, and the electric brake device 34 are controlled based on the target regenerative braking force $F_{RG}*$, the target hydraulic braking force $F_{HY}*$, and the target electric braking force $F_{EM}*$, respectively. Specifically, the HB-ECU 29 controls the inverter 26M such that the regenerative braking force $F_{RG}$ becomes equal to the target regenerative braking force $F_{RG}*$. The HY-ECU 230 controls the electric currents supplied to the motor 62 and the pressure holding valves 64 such that the hydraulic braking force $F_{HY}$ becomes equal to the target hydraulic braking force $F_{HY}*$. The EM-ECU 232 controls an electric current I supplied to the electric motor 144 such that the electric braking force $F_{EM}$ becomes equal to the target electric braking force $F_{EM}*$.

As for the hydraulic braking force $F_{HY}$, the set electric current is supplied to the motor 62 unless the required overall braking force $F_{SUM}*$ is 0, and the electric current supplied to the pressure holding valves 64 is determined such that a wheel cylinder pressure $P_W$ detected by the wheel cylinder pressure sensor 75 is equal to a target wheel cylinder pressure $P_W$ determined based on the target hydraulic braking force $F_{HY}*$. As for the electric braking force $F_{EM}$, the electric current supplied to the electric motor 144 is controlled such that an axial force (thrust load) $W_S$ detected by the axial-force sensor 190 is equal to a target axial force $W_S*$ determined based on the target electric braking force $F_{EM}*$. The basic control explained above is for generating the braking force that depends on the braking force request for both of the hydraulic braking force and the electric braking force. Thus, the control for the hydraulic braking force and the control for the electric braking force will be each referred to as "braking-force-request-dependent control" where appropriate.

According to the braking-force-request-dependent control described above, the regenerative braking force, the hydraulic braking force, and the electric braking force are controlled so as to cooperate with one another. Specifically, the regenerative braking force, the hydraulic braking force, and the electric braking force are cooperatively controlled such that the hydraulic braking force and the electric braking force cover the shortage in the required overall braking force that cannot be covered by the regenerative braking force, i.e., the insufficient braking force. The cooperative control enables an appropriate required overall braking force to be easily obtained even if the regenerative braking force varies due to a variation in the vehicle running speed or a variation in the state of charge (SOC) of the battery 28. Further, the hydraulic braking force and the electric braking force are cooperatively controlled such that the hydraulic braking force and the electric braking force are generated at the set distribution ratio ($\beta_{HY}$:$\beta_{EM}$). The cooperative control enables the two braking forces to be controlled according to a simple control rule, whereby an appropriate braking force required for the vehicle as a whole can be easily controlled.

[F] Special Control in Vehicle Brake System According to Embodiment

Hereinafter, there will be first explained problems experienced in the vehicle brake system constructed as described above and problems caused in the braking-force-request-dependent control and next explained special control executed in the vehicle brake system according to the embodiment to solve the problems.

i) Spacing Control in Electric Brake Device

In the hydraulic brake device 32 constructed as described above, the wheel cylinder pressure $P_W$, which is a pressure of the working fluid supplied from the actuator unit 44 to the wheel cylinder 84 of each wheel brake 46, is made 0 in the case where the target hydraulic braking force $F_{HY}$* is equal to 0 in the braking-force-request-dependent control, namely, in the non-request condition of the braking force request. In this case, however, the piston 86 is not immediately retracted unless the wheel cylinder pressure $P_W$ becomes lower than the atmospheric pressure, and a phenomenon occurs in which the front wheel 10F rotates with the brake pads 88 each as the friction member held in sliding contact with the disc rotor 80. That is, the so-called drag phenomenon occurs. When the vehicle runs thereafter, the piston 86 is gradually retracted and the drag phenomenon is eliminated. The drag phenomenon, however, causes a resistance to the rotation of the front wheel 10F, resulting in a loss of the vehicle driving energy, namely, deterioration in fuel consumption.

In view of the drag phenomenon, the electric brake device 34 is configured such that, in the non-request condition of the braking force, each piston 142 is moved by driving of the electric motor 144 to the set backward position, i.e., the position shown in FIG. 5. In other words, a spacing control is executed for establishing a clearance existing state in which a sufficient clearance exists between each friction member 126 and the disc rotor 122 as the rotary body. The establishment of the clearance existing state eliminates the drag phenomenon in the electric brake device 34 immediately after the braking force request has become absent. That is, the drag phenomenon is obviated or reduced in the electric brake device 34, so that the vehicle brake system enjoys a reduction in the loss of the vehicle driving energy in the system as a whole and improvement in fuel consumption.

In FIG. 4, the clearance is exaggeratedly illustrated. The clearance is considered as a total of the following four clearances shown in FIG. 4, i.e., a clearance CL1 between the front end portion 132 of the caliper main body 130 and the backup plate 128 of the brake pad 124a, a clearance CL2 between the friction member 126 of the brake pad 124a and the disc rotor 122, a clearance CL3 between the disc rotor 122 and the friction member 126 of the brake pad 124b, and a clearance CL4 between the backup plate 128 of the brake pad 124b and the piston 142.

ii) Response of Hydraulic Braking Force and Response of Electric Braking Force

As apparent from FIGS. 1 and 2, in the hydraulic brake device 32, the actuator unit 44 and each wheel brake 46 is connected by a relatively long flow passage. Further, the piston 86 needs to be advanced by a certain degree of distance before the hydraulic braking force $F_{HY}$ is generated after elimination of the drag phenomenon. Accordingly, even when the working fluid having a high pressure is supplied from the actuator unit 44, the pressure of the working fluid in the wheel cylinder 84 does not immediately increase, causing a delay in substantial generation of the hydraulic braking force $F_{HY}$, in other words, in generation of a substantial hydraulic braking force $F_{HY}$. That is, a hydraulic braking force delay is caused. The hydraulic brake device 32 is not equipped with an accumulator for accumulating the high-pressure working fluid in the actuator unit 44. Instead, the hydraulic brake device 32 is configured such that each pump 60 is activated when the braking force request is generated so as to provide the high-pressure working fluid. Thus, the hydraulic braking force delay is somewhat large though not significantly large.

In contrast to the hydraulic brake device 32, in the electric brake device 34, even in a situation in which the clearance existing state is being established by the spacing control, the clearance can be eliminated by rotating the electric motor 144 at a relatively high speed, and the piston 142 can be quickly moved to such an extent that the friction members 126 come into contact with the disc rotor 122. Thus, an electric braking force delay, which is a time lag between a time point of the generation of the braking force request and a time point of substantial generation of the electric braking force is relatively small.

Figure 7A:
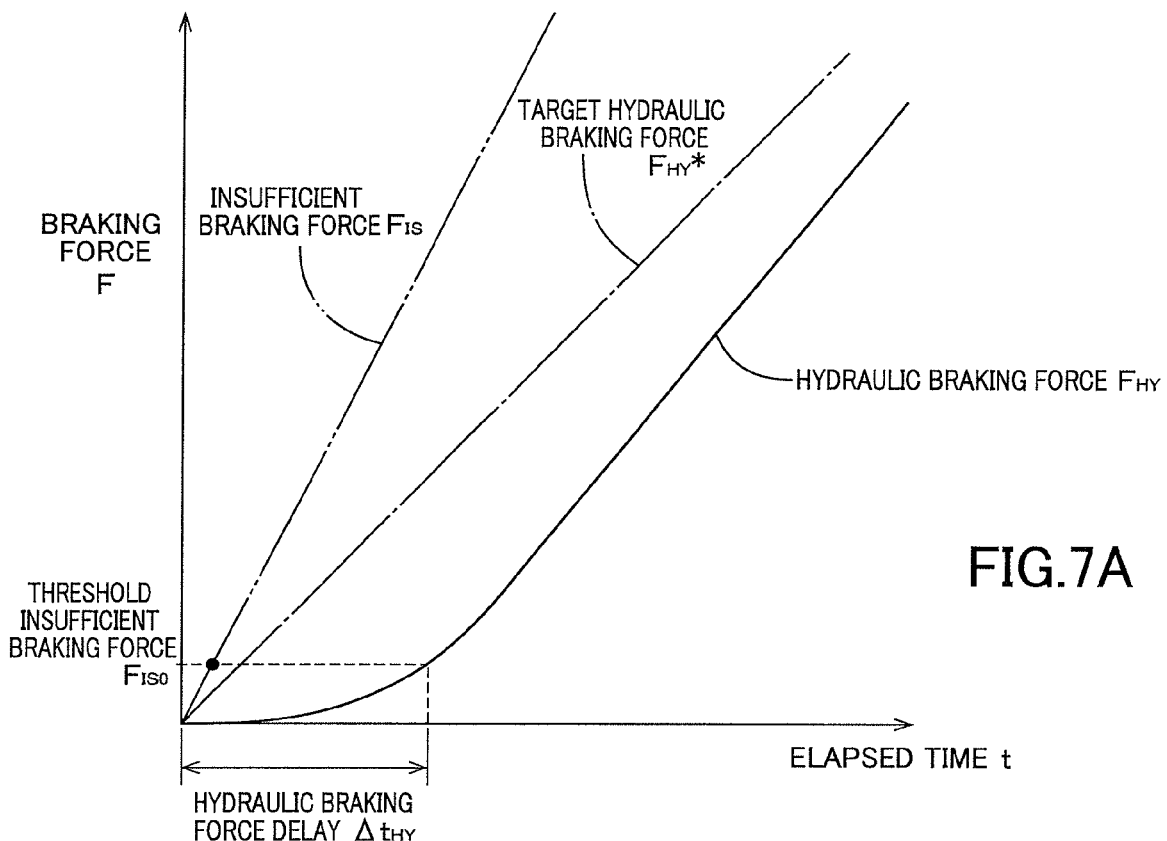
FIG. 7A is a graph showing a change in a hydraulic braking force generated based on a braking force request, with respect to an increase in a degree of the braking force request.
Figure 7B:
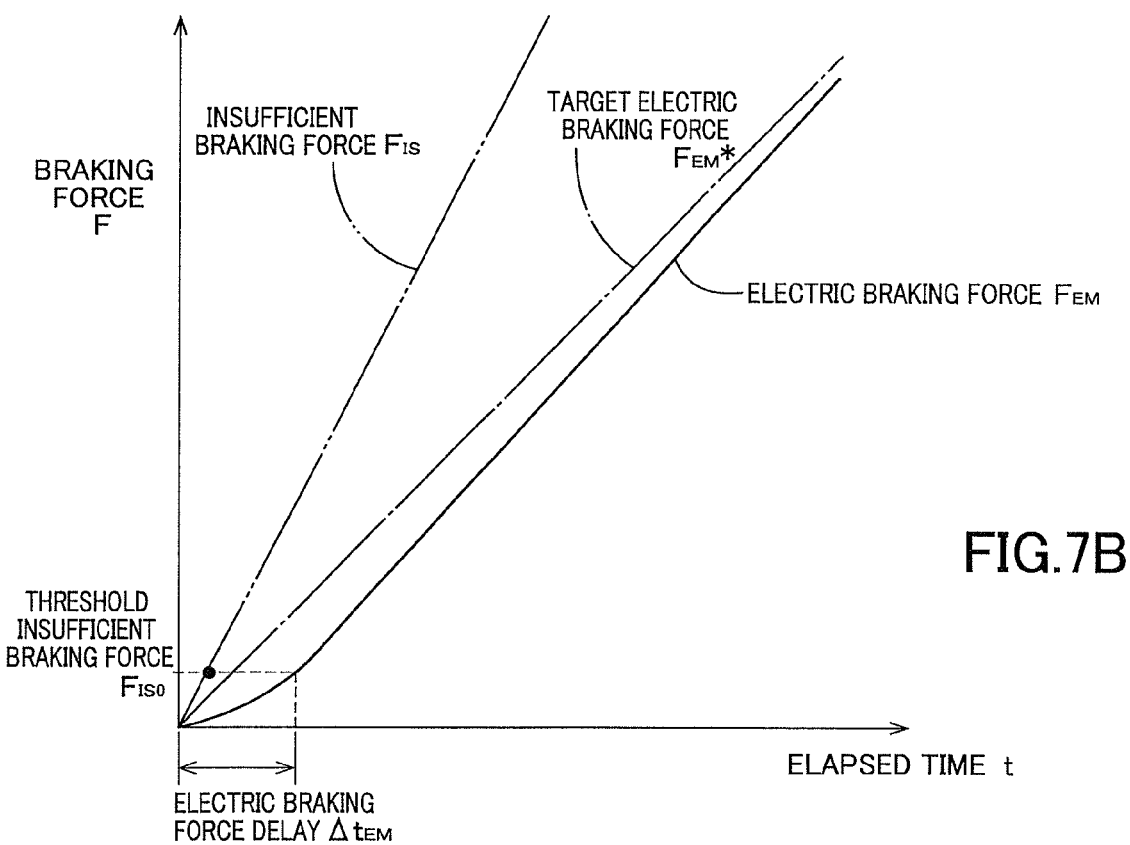
FIG. 7B is a graph showing a change in an electric braking force generated based on a braking force request, with respect to the increase in a degree of the braking force request.

Each of the graph of FIG. 7A and the graph of 7B indicates an actual braking force with respect to the braking force request indicated by the long dashed short dashed line. Specifically, the graphs of FIGS. 7A and 7B are for comparing, between the hydraulic brake device 32 and the electric brake device 34, a change in the actual braking force with respect to an elapsed time t from the time point of generation of the braking force request in an initial period of generation of the actual braking force. As apparent from the graphs, the electric braking force $F_{EM}$ shown in the graph of FIG. 7B follows an increase in a degree of the braking force request better than the hydraulic braking force $F_{HY}$ shown in the graph of FIG. 7A. Thus, an electric braking force delay $\Delta t_{EM}$ is smaller than a hydraulic braking force delay $\Delta t_{HY}$. That is, the electric brake device 34 is superior in response to the hydraulic brake device 32. As the braking force request indicated by the long dashed short dashed line, the target hydraulic braking force $F_{HY}$* and the target electric braking force $F_{EM}$* when the distribution ratio ($\beta_{HY}$:$\beta_{EM}$) is 1:1 are shown in the respective graphs. Further, the insufficient braking force $F_{IS}$ described above is shown in each graph as the braking force request indicated by the long dashed double-short dashed line.

iii) Clearance Removing Control

In the vehicle brake system according to the present embodiment, the spacing control described above is executed in the electric brake device 34, and a clearance removing control for removing the clearance described above in the electric brake device 34 is executed for the electric brake device 34 when the braking force request is generated, by utilizing a difference in response between the hydraulic brake device 32 and the electric brake device 34. Specifically, the clearance removing control is executed to remove the clearance in a period in which the hydraulic braking force delay $\Delta t_{HY}$ is being generated. Mutually different two sorts of the clearance removing control are prepared in the present embodiment as executable control. A selected one of the two sorts of the clearance removing control is executed. The two clearance removing controls are respectively referred to as a first clearance removing control and a second clearance removing control and will be hereinafter explained in order. For easier understanding of the concept of the clearance removing control, the following explanation is limited to the braking force request that depends on the operation of the brake pedal 40, namely, the braking force request based on the brake operation, not the braking force request that depends on the automatic brake.

iii-a) First Clearance Removing Control

The first clearance removing control is started at a time point when the braking force request is generated and is executed till a time point when the degree of the braking force request increases up to a threshold degree. After the degree of the braking force request has once reached the threshold degree, the braking-force-request-dependent control as explained above, which is the basic control, is executed for the electric brake device 34. In this respect, the clearance removing control is not executed for the hydraulic brake device 32, and the braking-force-request-dependent control is executed for the hydraulic brake device 32 from the time point of generation of the braking force request.

In the braking-force-request-dependent control, the degree of the braking force request is determined in principle based on the brake operation force a as explained above. In a period in which the first clearance removing control being executed, however, the degree of the braking force request is determined based on both of the brake operation force G and an operation stroke δ which is an operation amount of the brake pedal 40. As shown in FIGS. 1 and 2, the brake pedal 40 is provided with an operation stroke sensor 234 for detecting the operation stroke δ. Specifically, the HY-ECU 230 determines the required overall braking force $F_{SUM}*$ by adding: a product of the detected operation stroke δ and an operation-amount-dependent gain $α_δ$; and a product of the master pressure $P_M$ and an operation-force-dependent gain $α_σ'$ different from the operation-force-dependent gain $α_σ$. In other words, the required overall braking force $F_{SUM}*$ is determined based on a weighted sum of the brake operation force σ and the brake operation amount. Thus, the operation stroke δ which represents the brake operation amount is one example of an operation value indicative of the degree of the brake operation, and it may be accordingly construed that the operation stroke δ is a parameter indicative of the required overall braking force $F_{SUM}*$. The reason to determine the required overall braking force $F_{SUM}*$ based on both of the operation stroke δ and the master pressure $P_M$ during execution of the first clearance removing control is that an increase in the master pressure $P_M$ is delayed in an initial period of the brake operation arising from the structure of the master cylinder 42, for instance. On the other hand, the reason to determine the required overall braking force $F_{SUM}*$ not based on the operation stroke δ after the first clearance removing control is ended is that the master pressure $P_M$ indicates a driver's intention with respect to the braking force request more accurately than the operation stroke δ.

As explained above, the HY-ECU 230 determines the insufficient braking force $F_{IS}$ by subtracting the target regenerative braking force $F_{RG}*$ from the determined required overall braking force $F_{SUM}*$ and further determines, based on the insufficient braking force $F_{IS}$, the target hydraulic braking force $F_{HY}*$ and the target electric braking force $F_{EM}*$ according to the distribution ratio ($β_{HY}:β_{EM}$). The insufficient braking force $F_{IS}$ is a sum of the hydraulic braking force $F_{HY}$ and the electric braking force $F_{EM}$ that should be generated. Thus, the insufficient braking force $F_{IS}$ is regarded as the degree of the braking force request, and the degree of the braking force request is compared with the threshold degree based on the insufficient braking force $F_{IS}$. Specifically, a threshold insufficient braking force $F_{IS0}$ is set as the threshold degree, and it is determined that the degree of the braking force request reaches the threshold degree when the insufficient braking force $F_{IS}$ reaches the threshold insufficient braking force $F_{IS0}$.

The threshold insufficient braking force $F_{IS0}$ as the threshold degree is set as indicated in the graphs of FIG. 7. Each graph shows a change, with time, of the hydraulic braking force $F_{HY}$ or the electric braking force $F_{EM}$ in the case where a normal brake operation (hereinafter referred to as "normal brake operation" where appropriate) is performed, namely, in the case where not sudden braking and extremely slow braking, but a brake operation that is estimated to be most frequently performed is performed. As the threshold insufficient braking force $F_{IS0}$, there is set the insufficient braking force $F_{IS}$ at a time point when a length of time from initiation of the normal brake operation to substantial generation of the hydraulic braking force $F_{HY}$ elapses, namely, at a time point when a time corresponding to the hydraulic braking force delay $Δt_{HY}$ elapses.

In the first clearance removing control, the piston 142 of the electric brake actuator 110 is advanced at the highest speed. Specifically, a maximum admissible current is supplied to the electric motor 144. In the normal brake operation, therefore, before the insufficient braking force $F_{IS}$ reaches the threshold insufficient braking force $F_{IS0}$ set as described above, the piston 142 is advanced to a position at which the clearance between the brake pads 124a, 124b and the disc rotor 122 is removed.

As explained above, the EM-ECU 232 recognizes, based on the detection signal of the resolver 188, a piston position $p_P$ which is a position of the piston 142 in the axial direction. Further, the EM-ECU 232 stores, as a clearance removed position, a position of the piston 142 at a time point when the electric braking force $F_{EM}$ has been actually generated in a preceding brake operation, based on the value of the axial force $W_S$ detected by the axial-force sensor 190. In the first clearance removing control, a position slightly backward of the clearance removed position, namely, a position at which a slight margin exists, is set as a target forward position $p_P*$, and the piston 142 is moved to the target forward position $p_P*$ at a high speed. That is, there is supplied, to the electric motor 144, an electric current I that enables the piston 142 to be advanced at the highest speed. It is noted that the first clearance removing control is continued until the insufficient braking force $F_{IS}$ reaches the threshold insufficient braking force $F_{IS0}$. Accordingly, in a strict sense, the piston 142 is kept located at the target forward position $p_P*$ and waits for initiation of the braking-force-request-dependent control to be subsequently executed, except an exceptional case in which the speed of the brake operation is extremely high, for instance.

In a state in which the drag phenomenon in the electric brake device 34 is avoided by executing the spacing control, the first clearance removing control is executed, whereby the clearance generated as a result of execution of the spacing control can be effectively removed when the braking force request is made. Specifically, the timing of substantial generation of the electric braking force $F_{EM}$ can be made appropriate with respect to the timing of substantial generation of the hydraulic braking force $F_{HY}$ when the braking force request is made. Moreover, it is possible to permit these timings to coincide with each other.

In the first clearance removing control, an advancing speed $v_P$ of the piston 142 may be made equal to a speed that enables the clearance to be removed within a time period from a time point of generation of the braking force request in the normal brake operation to a time point when the insufficient braking force $F_{IS}$ becomes equal to the threshold insufficient braking force $F_{IS0}$. In other words, it is possible to advance the piston 142 at a speed that enables the clearance to be removed when the degree of the braking force request becomes equal to the threshold degree. Specifically, the advancing speed $v_P$ of the piston 142 is set such that the piston 142 is advancing to the target forward position $p_P^*$ over a time period in which the hydraulic braking force delay $\Delta t_{HY}$ is being generated in the normal brake operation. Execution of the thus configured first clearance removing control enables a smooth shift to the braking-force-request-dependent control to be subsequently executed, without substantially stopping the piston 142.

iii-b) Second Clearance Removing Control

Figure 8A:
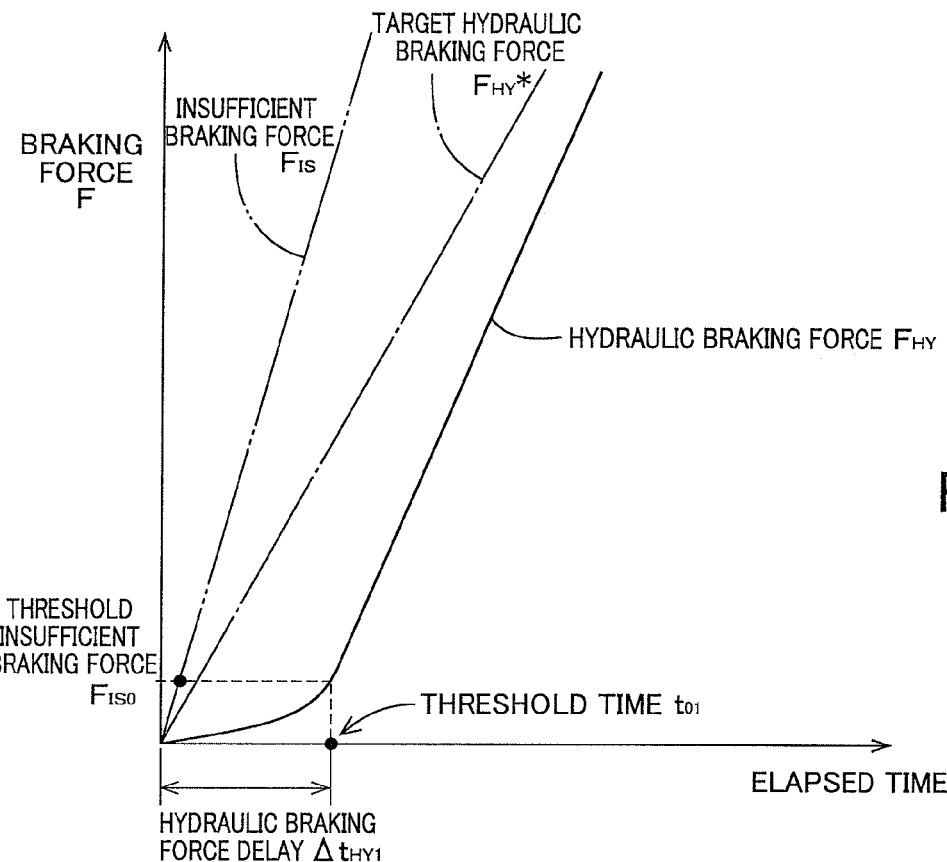
FIG. 8A is a graph showing a change in the hydraulic braking force when a speed of a brake operation is relatively high.
Figure 8B:
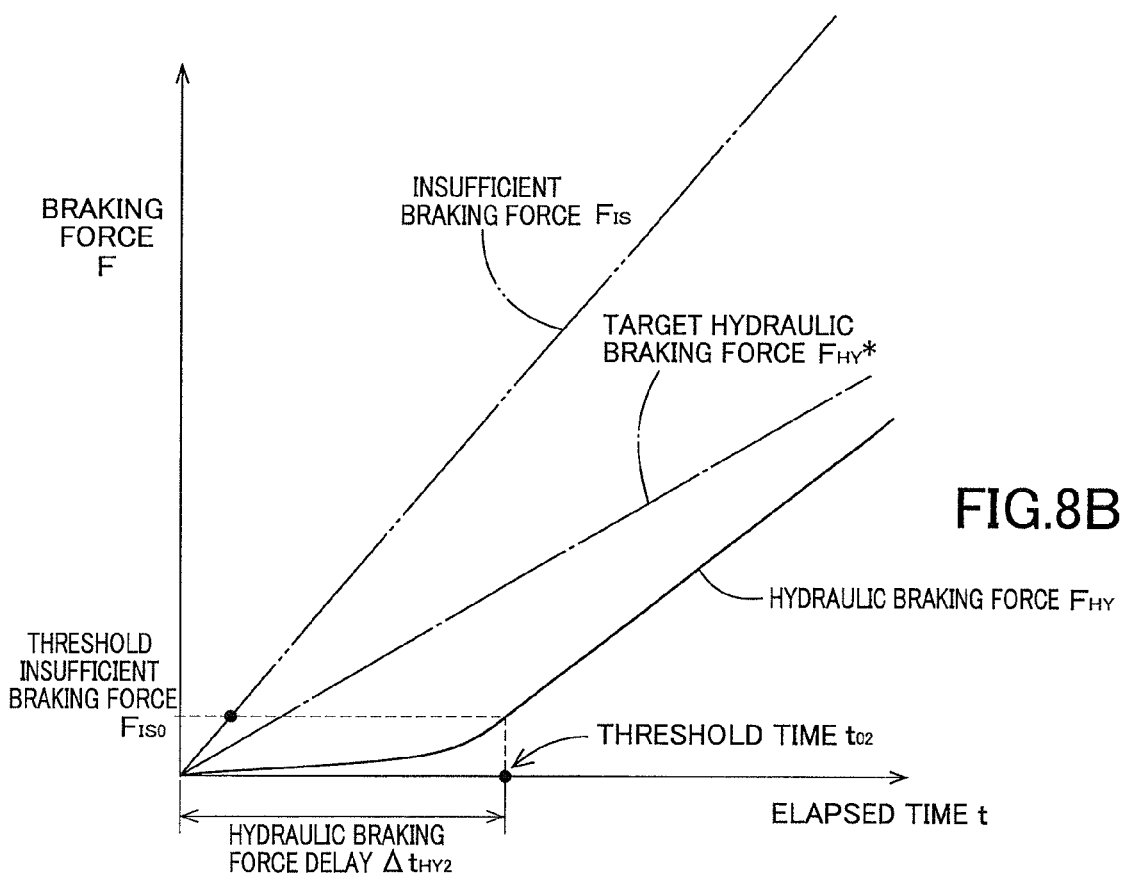
FIG. 8B is a graph showing a change in the hydraulic braking force when the speed of the brake operation is relatively low.

In executing the second clearance removing control, a length of time during which the second clearance removing control is being executed is changed in accordance with the speed of the brake operation. In short, the hydraulic braking force delay $\Delta t_{HY}$ in the hydraulic brake device 32 changes depending upon a change in the speed of the brake operation. Specifically, in a relatively fast brake operation, an increase gradient of the insufficient braking force $F_{IS}$ and an increase gradient of the hydraulic braking force $F_{HY}$ are steep, and the hydraulic braking force delay $\Delta t_{HY1}$ is short, as shown in a graph of FIG. 8A. In a relatively slow brake operation, on the other hand, the respective increase gradients of the insufficient braking force $F_{IS}$ and the hydraulic braking force $F_{HY}$ are gentle, and the hydraulic braking force delay $\Delta t_{HY2}$ is long, as shown in a graph of FIG. 8B. In consideration of such phenomena, the length of time during which the second clearance removing control is being executed is changed based on an increase gradient $dF_{IS}$ of the insufficient braking force $F_{IS}$ indicative of the degree of the braking force request.

Specifically, the HY-ECU 230 recognizes the increase gradient $dF_{IS}$ all the time and measures an elapsed time t from a time point when the operation stroke $\delta$ of the brake pedal 40 has exceeded 0 (hereinafter referred to as "operation start time point" where appropriate). Based on the increase gradients $dF_{IS}$ recognized at respective points of time, the HY-ECU 230 calculates, as a threshold time $t_0$, a time from the operation start time point to a time point when the insufficient braking force $F_{IS}$ reaches the threshold insufficient braking force $F_{IS0}$ that is the insufficient braking force $F_{IS}$ at which the hydraulic braking force $F_{HY}$ is substantially generated. The HY-ECU 230 calculates the threshold time $t_0$ all the time. It is noted that the threshold time $t_0$ is conceptually indicated as $t_{01}$ in FIG. 8A and toe in FIG. 8B. The HY-ECU 230 executes the second clearance removing control until the elapsed time t becomes equal to the threshold time $t_0$, namely, until the threshold time $t_0$ elapses. After the threshold time $t_0$ elapses, the HY-ECU 230 stops executing the second clearance removing control and executes the braking-force-request-dependent control.

As is understood from the explanation above, the target forward position $p_P^*$ set in relation to the piston 142 of the electric brake actuator 110 is considered as the piston position $p_P$ at a time point when the electric braking force $F_{EM}$ is substantially generated. As explained above, the EM-ECU 232 recognizes the piston position $p_P$ at the current time point, and the HY-ECU 230 calculates: a remaining advancing distance $(p_P^*-p_P)$ at the current time point required for the piston 142 to reach the target forward position $p_P^*$, based on the piston position $p_P$ and the target forward position $p_P^*$; and a remaining time $(t_0-t)$ at the current time point remaining before the piston 142 reaches the target forward position $p_P^*$, based on the threshold time $t_0$ and the elapsed time t at the current time point. The HY-ECU 230 determines the advancing speed $v_P$ of the piston 142 based on the remaining advancing distance $(p_P^*-p_P)$ and the remaining time $(t_0-t)$, and the EM-ECU 232 advances the piston 142 based on the advancing speed $v_P$. Specifically, the EM-ECU 232 supplies, to the electric motor 144, a supply current I based on the advancing speed $v_P$. Thus, according to the second clearance removing control, the advancing speed $v_P$ of the piston 142 is changed based on the increase gradient of the braking force request.

In the time period during which the second clearance removing control is being executed, the required overall braking force $F_{SUM}^*$ is determined based on the brake operation force σ and the brake operation amount, specifically, based on both of the master pressure $P_M$ and the operation stroke δ, as in the time period during which the first clearance removing control is being executed, for the same reason, and the insufficient braking force $F_{IS}$ is determined based on the required overall braking force $F_{SUM}^*$.

By executing the second clearance removing control, it is possible to obtain advantages similar to those obtained by executing the first clearance removing control, irrespective of the speed of the brake operation, in short, the advantages that the timing of substantial generation of the electric braking force $F_{EM}$ is made appropriate with respect to the timing of substantial generation of the hydraulic braking force $F_{HY}$. Further, irrespective of the speed of the brake operation, the second clearance removing control can be smoothly shifted to the braking-force-request-dependent control to be subsequently executed, without substantially stopping the piston 142.

In the second clearance removing control, the advancing speed $v_P$ of the piston 142 is changed based on the increase gradient $dF_{IS}$ of the insufficient braking force $F_{IS}$. As in the first clearance removing control, the piston 142 may be advanced to the target forward position $p_P^*$ at the highest speed and may be kept stopped at the position. In this state, the braking-force-request-dependent control to be subsequently executed may be started.

[G] Flow of Control Process Including Clearance Removing Control

Figure 9:
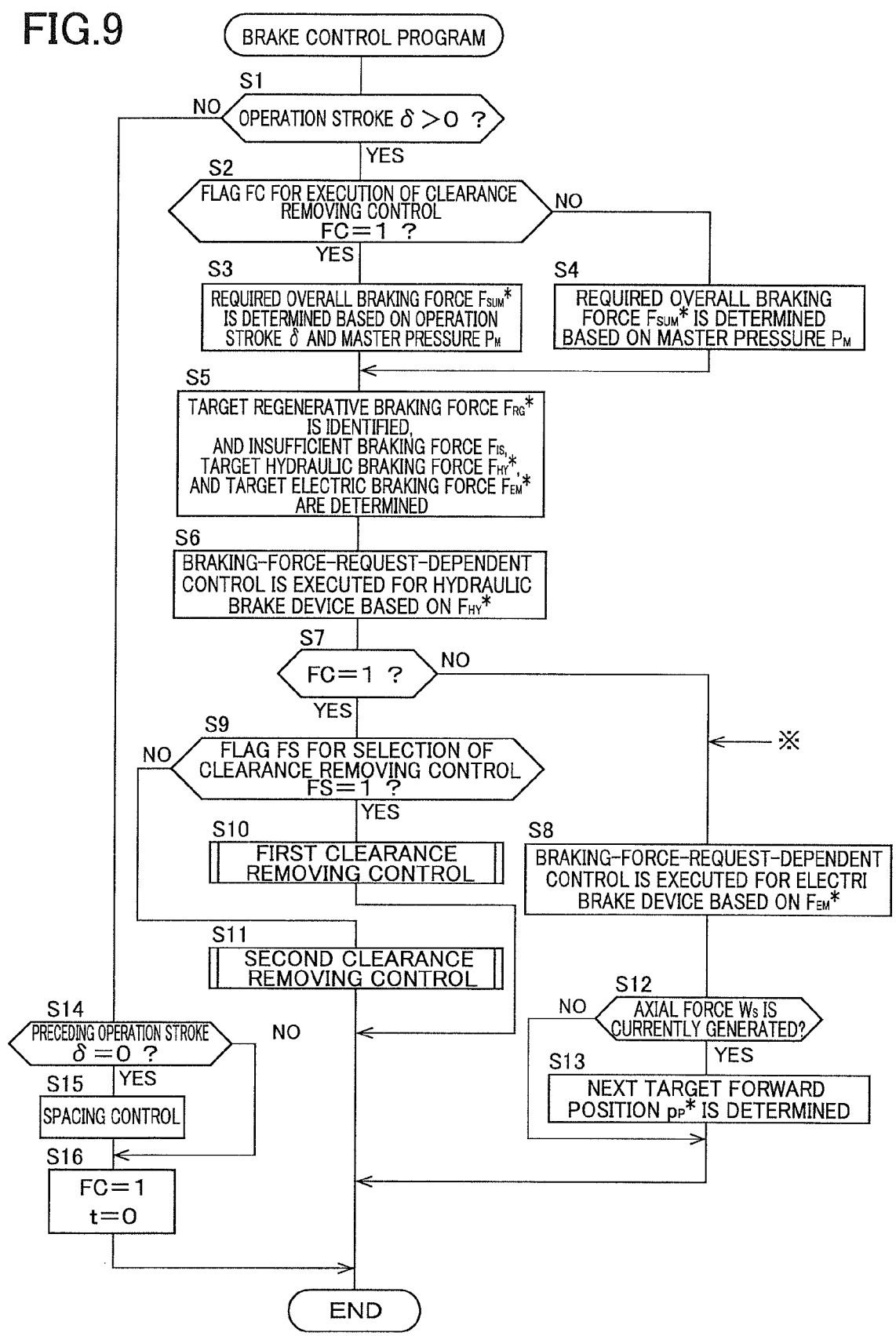
FIG. 9 is a flowchart showing a brake control program executed in the vehicle brake system according to the embodiment.

The controls in the vehicle brake system of the present embodiment including the clearance removing control described above are executed such that the HY-ECU 230 mainly and repeatedly executes a brake control program indicated by a flowchart of FIG. 9 at a short time pitch from several to several tens of milliseconds (msec). It is possible to change, by setting, which one of the first clearance removing control and the second clearance removing control is to be executed. The control process according to the brake control program will be explained referring to the flowchart of FIG. 9.

In the process according to the brake control program, it is initially determined at step S1 whether the brake operation is being performed, based on the detection value of the operation stroke δ. (Here, "step S1" is abbreviated as "S1", and other steps are similarly abbreviated.) When the brake operation has been performed or is being performed, it is determined at S2 which one of a process at S3 and a process at S4 is to be executed, based on a value of a flag FC for execution of the clearance removing control. The value of the flag FC for execution of the clearance removing control is set to "1" in a condition in which the clearance removing control is being executed or is to be executed (hereinafter referred to as "clearance removing control execution condition" where appropriate) while the value of the flag FC is set to "0" in a condition in which the clearance removing control is not being executed or is to be ended (hereinafter referred to as "clearance removing control non-execution condition" where appropriate).

In the clearance removing control execution condition, the required overall braking force $F_{SUM}*$ is determined at S3 based on: the operation stroke δ which is the brake operation amount; and the master pressure $P_M$ as the index of the brake operation force. In the clearance removing control non-execution condition, the required overall braking force $F_{SUM}*$ is determined at S4 based on the master pressure $P_M$. At the time point when the brake operation is started, the value of the flag FC for execution of the clearance removing control is "1". Accordingly, the required overall braking force $F_{SUM}*$ is determined based on the operation stroke δ and the master pressure $P_M$. Subsequently, at S5, the target regenerative braking force $F_{RG}*$ is identified, and the insufficient braking force $F_{IS}$, the target hydraulic braking force $F_{HY}*$, and the target electric braking force $F_{EM}*$ are determined based on the required overall braking force $F_{SUM}*$. The processes at S3-S5 are regarded as a process for recognizing the degree of the braking force request.

At S6, the braking-force-request-dependent control is executed for the hydraulic brake device 32 based on the target hydraulic braking force $F_{HY}*$ as explained above.

At S7, it is again determined, based on the value of the flag FC for execution of the clearance removing control, which one of the clearance removing control execution condition and the clearance removing control non-execution condition the current condition is. When it is determined that the current condition is the clearance removing control non-execution condition, the braking-force-request-dependent control is executed at S8 for the electric brake device 34 based on the target electric braking force $F_{EM}*$.

When it is determined at S7 that the current condition is the clearance removing control execution condition, it is determined at S9, based on a value of a flag FS for selection of the clearance removing control, which one of the first clearance removing control and the second clearance removing control is to be executed. The value of the flag FS for selection of the clearance removing control is set to "1" in the case where execution of the first clearance removing control is set while the flag FS is set to "0" in the case where execution of the second clearance removing control is set. In the case where the first clearance removing control is executed, a subroutine for the first clearance removing control at S10 is executed. In the case where the second clearance removing control is executed, a subroutine for the second clearance removing control at S11 is executed.

Figure 10A:
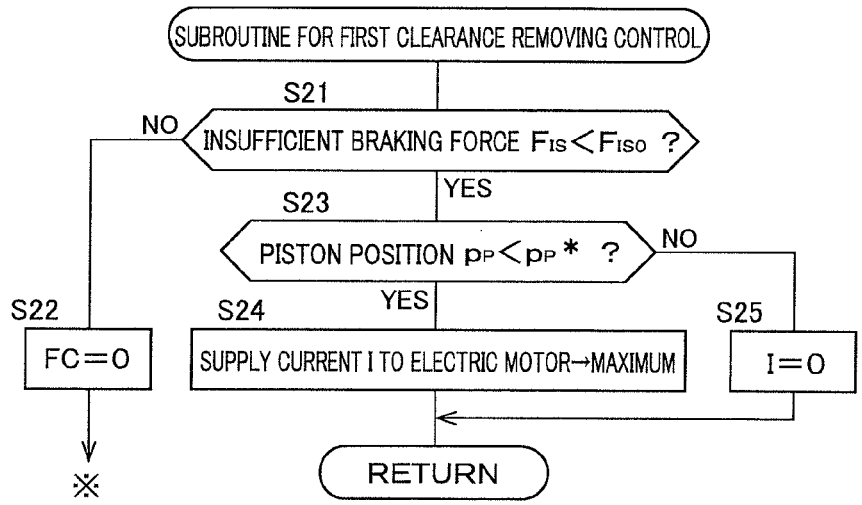
FIG. 10A is a flowchart showing a subroutine for a first clearance removing control of the brake control program.

In a process according to the subroutine for the first clearance removing control shown in FIG. 10A, it is initially determined at S21 whether the process according to the subroutine is to be ended, based on the insufficient braking force $F_{IS}$ indicative of the degree of the braking force request. Specifically, it is determined that the process according to the subroutine is to be ended when the insufficient braking force $F_{IS}$ becomes equal to or greater than the threshold insufficient braking force $F_{IS0}$ which indicates the threshold degree for the braking force request. In this case, the value of the flag FC for execution of the clearance removing control is set to "0" at S22, and the braking-force-request-dependent control based on the target electric braking force $F_{EM}*$ is executed for the electric brake device 34 at S8.

When the insufficient braking force $F_{IS}$ is less than the threshold insufficient braking force $F_{IS}$, it is determined that the process according to the subroutine for the first clearance removing control is to be executed or continued. In this case, the control flow goes to S23 and the subsequent steps. At S23, it is determined, based on the piston position $p_P$ which is the position of the piston 142 of the electric brake actuator 110, whether the piston 142 has reached the target forward position $p_P*$ recognized as a position slightly backward of a position at which the electric braking force $F_{EM}$ is substantially generated. When the piston 142 has not yet reached the target forward position $p_P*$, the supply current I to the electric motor 144 is determined to be equal to the maximum current at S24. Based on the supply current I, the EM-ECU 232 controls the electric brake device 34. When the piston 142 has reached the target forward position $p_P*$, the supply current I is determined to be equal to "0" at S25. In this case, the EM-ECU 232 controls the electric brake device 34 so as to stop the advancing movement of the piston 142. Thereafter, the process according to the subroutine for the first clearance removing control is ended.

Figure 10B:
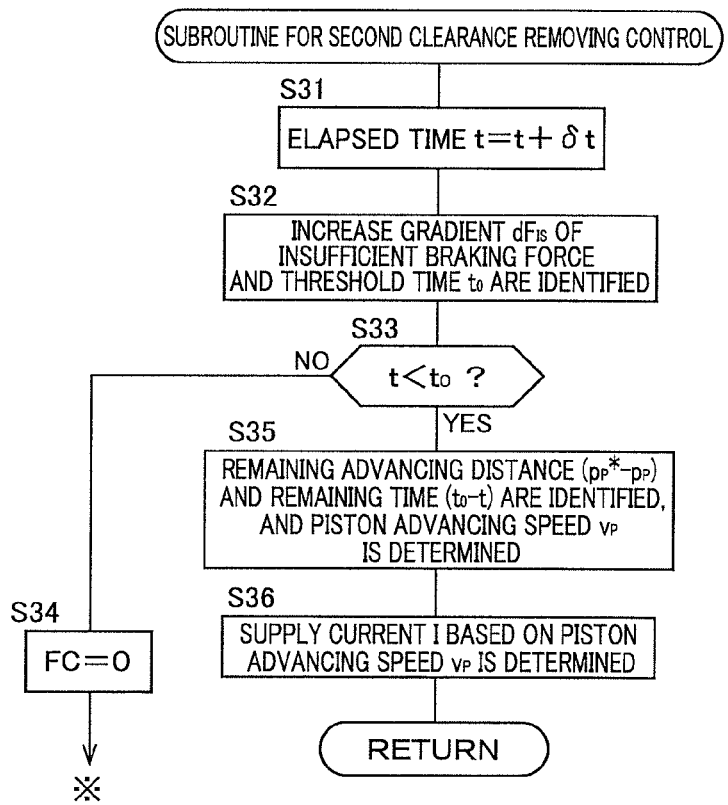
FIG. 10B is a flowchart showing a subroutine for a second clearance removing control of the brake control program.

In a process according to the subroutine for the second clearance removing control shown in FIG. 10B, the elapsed time t from the time point of start of the brake operation is measured at S31. Specifically, the elapsed time t is incremented by a count-up time δt corresponding to an execution pitch of the program. Subsequently, the increase gradient $dF_{IS}$, which is the increase gradient of the insufficient braking force $F_{IS}$ at the current time point, is determined by calculation at S32, based on the insufficient braking force $F_{IS}$ at the time of previous execution of the program and the insufficient braking force $F_{IS}$ at the current time point. Based on the increase gradient $dF_{IS}$, a time when the insufficient braking force $F_{IS}$ is estimated to reach the threshold insufficient braking force $F_{IS0}$ is determined as a threshold time $t_0$ by calculation.

It is subsequently determined at S33 whether the elapsed time t has reached the threshold time $t_0$. When it is determined that the elapsed time t has reached the threshold time $t_0$, the value of the flag FC for execution of the clearance removing control is set to "0" at S34 so as to end the process according to the subroutine. The control flow then goes to S8 at which the braking-force-request-dependent control based on the target electric braking force $F_{EM}*$ is executed for the electric brake device 34. When it is determined that the elapsed time t has not yet reached the threshold time $t_0$, S35 is implemented to determine, by calculation, (a) the remaining advancing distance $(p_P*-p_P)$ indicating how far the piston 142 will advance from the current time point before reaching the target forward position $p_P*$, based on the piston position $p_P$ and the target forward position $p_P*$ and (b) the remaining time $(t_0-t)$ which remains before reaching the threshold time $t_0$, based on the elapsed time t at the current time point and the threshold time $t_0$. Based on the remaining advancing distance $(p_P*-p_P)$ and the remaining time $(t_0-t)$, the piston advancing speed $v_P$ is determined as a speed at which the piston 142 should advance. The EM-ECU 232 subsequently determines, at S36, the supply current I to the electric motor 144 based on the piston advancing speed $v_P$, so as to control the electric brake device 34. Thereafter, the process according to the subroutine for the second clearance removing control is ended.

The axial force $W_S$ generated in the electric brake actuator is recognized all the time. In the case where the braking-force-request-dependent control at S8 is executed for the electric brake device 34, it is determined at S12 that the axial force $W_S$ is generated when the axial force $W_S$ becomes equal to a level at which the substantial electric braking force $F_{EM}$ is generated. Subsequently, at S13, the target forward position $p_P^*$ of the piston 142 to be used in next execution of the program is determined based on the axial force $W_S$.

When it is determined, at S1, based on the operation stroke δ that the brake operation is not being performed, the control flow goes to S14 to determine whether the brake operation has ended in current execution of the program. When an affirmative determination is made at S14, the control flow goes to S15 at which the spacing control is executed for the electric brake device 34 so as to establish the clearance existing state in the non-request condition of the braking force. Further, when it is determined at S1 that the brake operation is not being performed, the value of the flag FC for execution of the clearance removing control is reset to "1" and the value of the elapsed time t is reset to "0", at S16. A series of the processes described above is ended, and one execution of the brake control program is ended.

[H] Modification

The vehicle brake system according to the illustrated embodiment includes the regenerative brake device 30. The vehicle brake system according to the present disclosure does not necessarily have to include the regenerative brake device. That is, the vehicle brake system may be constituted by the hydraulic brake device and the electric brake device. In the vehicle brake system of the illustrated embodiment, the hydraulic brake device 32 is provided for the front wheels 10F, and the electric brake device 34 is provided for the rear wheels 10R. The present disclosure is not limited to this configuration. For instance, the system may be configured such that the electric brake device is provided for the front wheels 10F and the hydraulic brake device is provided for the rear wheels 10R.

The above explanation of the vehicle brake system of the illustrated embodiment is made with respect to the braking force request based on the operation of the brake pedal 40 by the driver. The system may be configured such that the clearance removing control is executed similarly for the braking force request by the automatic brake.

In the vehicle brake system of the illustrated embodiment, the insufficient braking force $F_{IS}$ is used as the braking force request for determining whether or not the clearance removing control is to be executed. Any one of the target hydraulic braking force $F_{HY}^*$ and the target electric braking force $F_{EM}^*$ may be used. Further, in the case where the regenerative braking force is not taken into consideration or in the case where the system does not include the regenerative brake device, the required overall braking force $F_{SUM}^*$ may be used.

In the vehicle brake system of the illustrated embodiment, the spacing control by the operation of the electric motor 144 is executed for the electric brake device 34 in the non-request condition of the braking force. The spacing control does not necessarily have to be executed as long as the clearance can be generated in the non-request condition of the braking force only by the force of the biasing mechanism 200 including the spiral spring 206, for instance.

What is claimed is:

1. A vehicle brake system, comprising: a hydraulic brake device provided for one of a front wheel and a rear wheel and configured to generate a hydraulic braking force that depends on a pressure of a working fluid; an electric brake device provided for the other of the front wheel and the rear wheel and configured to generate an electric braking force that depends on a force exerted by an electric motor; and a controller configured to control operations of the hydraulic brake device and the electric brake device, wherein the electric brake device includes a rotary body configured to rotate with the other of the front wheel and the rear wheel, a friction member configured to be pushed onto the rotary body, and an actuator configured to advance a piston by the electric motor so as to push the friction member onto the rotary body, the electric brake device being configured such that, when no braking force request is made, the piston is retracted to a set backward position so as to allow a clearance to exist between the friction member and the rotary body, wherein the controller is configured to:
execute, for the hydraulic brake device, a braking-force-request-dependent control in which the hydraulic braking force in accordance with a degree of the braking force request is generated, the braking-force-request-dependent control being executed from a time point of generation of the braking force request; and execute, for the electric brake device, (a) a clearance removing control for removing the clearance, the clearance removing control being executed from the time point of generation of the braking force request till a time point when the degree of the braking force request increases up to a threshold degree, and (b) a braking-force-request-dependent control in which the electric braking force in accordance with the degree of the braking force request is generated, the braking-force-request-dependent control being executed after the time point when the degree of the braking force request becomes equal to the threshold degree, wherein the threshold degree is set based on a hydraulic braking force delay which is a delay of substantial generation of the hydraulic braking force by the hydraulic brake device with respect to the generation of the braking force request.

2. The vehicle brake system according to claim 1, wherein the clearance removing control is executed such that the piston is advanced at a speed that enables the clearance to be removed when the degree of the braking force request becomes equal to the threshold degree.

3. The vehicle brake system according to claim 1, further comprising a brake operation member to be operated by a driver,
wherein the controller is configured to determine the degree of the braking force request based on at least one of a brake operation amount which is an amount of operation of the brake operation member and a brake operation force which is a force applied, to the brake operation member.

4. The vehicle brake system according to claim 3,
wherein the hydraulic brake device includes: a wheel brake provided for the one of the front wheel and the rear wheel and configured to brake the one of the front wheel and the rear wheel being rotated; and a master cylinder to which the brake operation member is coupled, the master cylinder being for supplying the working fluid to the wheel brake, and
wherein the controller is configured to determine the brake operation force based on a pressure of the working fluid supplied from the master cylinder.

5. The vehicle brake system according to claim 3, wherein the controller is configured to determine the degree of the braking force request based on both of the brake operation amount and the brake operation force before the degree of the braking force request becomes equal to the threshold degree and determine the degree of the braking force request based on the brake operation force after the degree of the braking force request becomes equal to the threshold degree.

6. The vehicle brake system according to claim 1, further comprising a regenerative brake device provided for at least one of the front wheel and the rear wheel and configured to generate a regenerative braking force utilizing electric power generation by rotation of the at least one of the front wheel and the rear wheel,
   wherein the controller is configured to control the operations of the hydraulic brake device and the electric brake device such that the hydraulic braking force and the electric braking force cover an insufficient braking force that cannot be covered by the regenerative braking force, the insufficient braking force being a shortage in an overall braking force required for the vehicle corresponding to the braking force request.

7. A vehicle brake system comprising:
   a hydraulic brake device provided for one of a front wheel and a rear wheel and configured to generate a hydraulic braking force that depends on a pressure of a working fluid;
   an electric brake device provided for the other of the front wheel and the rear wheel and configured to generate an electric braking force that depends a force exerted by an electric motor, and
   a controller configured to control operation of the hydraulic brake device and the electric brake device,
   wherein the electric brake device includes a rotary body configured to rotate with the other of the front wheel and the rear wheel, a friction member configured to be pushed onto the rotary body, and an actuator configured to advance a piston by the electric motor so as to push the friction member onto the rotary body, the electric brake device being configured such that, when no braking force request is made, the piston is retracted to a set backward position so as to allow a clearance to exist between the friction member and the rotary body,
   wherein the controller is configured to:
      execute, for the hydraulic brake device, a braking-force-request-dependent control in which the hydraulic braking force in accordance with a degree of the braking force request is generated, the braking-force-request-dependent control being executed from a time point of generation of the braking force request;
      execute, for the electric brake device, (a) clearance removing control for removing the clearance, the clearance removing control being executed from the time point of generation of the braking force request till a time point when the degree of the braking force request increases up to a threshold degree, and (b) a braking-force-request-dependent control in which the electric braking force in accordance with the degree of the braking force request is generated, the braking-force-request-dependent control being executed after the time point when the degree of the braking force request becomes equal to the threshold degree;
      estimate, based on an increase gradient of the braking force request, a threshold time which is a time from the time point of generation of the braking force request to the time point when the degree of the braking force request becomes equal to the threshold degree; and
      execute, for the electric brake device, the clearance removing control until the threshold time elapses and the braking-force-request-dependent control after the threshold time elapses.

\* \* \* \* \*